(12) United States Patent
Lei et al.

(10) Patent No.: US 12,356,199 B2
(45) Date of Patent: Jul. 8, 2025

(54) COMMUNICATION METHOD, APPARATUS, AND SYSTEM FOR VERIFYING IDENTITY OF USER EQUIPMENT BY NETWORK DEVICE

(71) Applicant: HUAWEI TECHNOLOGIES CO., LTD., Shenzhen (CN)

(72) Inventors: Zhongding Lei, Singapore (SG); Haiguang Wang, Singapore (SG); Xin Kang, Singapore (SG)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 211 days.

(21) Appl. No.: 17/952,879

(22) Filed: Sep. 26, 2022

(65) Prior Publication Data
US 2023/0014494 A1 Jan. 19, 2023

Related U.S. Application Data

(63) Continuation of application No. PCT/CN2021/079159, filed on Mar. 4, 2021.

(30) Foreign Application Priority Data

Mar. 27, 2020 (CN) .......................... 202010231947.9

(51) Int. Cl.
H04W 12/06 (2021.01)
H04W 12/71 (2021.01)
H04W 12/75 (2021.01)

(52) U.S. Cl.
CPC ........... *H04W 12/71* (2021.01); *H04W 12/06* (2013.01); *H04W 12/75* (2021.01)

(58) Field of Classification Search
CPC ..... H04W 12/75; H04W 12/71; H04W 12/06; H04W 12/40; H04W 4/40; H04W 4/06;
(Continued)

(56) References Cited

U.S. PATENT DOCUMENTS

2011/0010543 A1* 1/2011 Schmidt ................ H04W 12/06
713/168
2012/0108205 A1* 5/2012 Schell ................... H04W 12/06
455/411

(Continued)

FOREIGN PATENT DOCUMENTS

CN 109302415 A 2/2019
CN 109756447 A 5/2019

(Continued)

OTHER PUBLICATIONS

3GPP TS 22.125 V17.1.0 (Dec. 2019), 3rd Generation Partnership Project; Technical Specification Group Services and System Aspects; Unmanned Aerial System (UAS) support in 3GPP; Stage 1;Release 17, 16 pages.

(Continued)

Primary Examiner — Amare F Tabor
(74) Attorney, Agent, or Firm — HAUPTMAN HAM, LLP

(57) ABSTRACT

A communication method and apparatus are provided. The method includes: Second user equipment sends a second message, first user equipment sends a first message to a network device in response to the second message, to request to perform identity verification on the second user equipment, and the network device verifies whether an identity of the second user equipment is valid, and sends, to the first user equipment, a verification result indicating whether the identity of the second user equipment is valid. Alternatively, the first user equipment sends a third message for request the second user equipment to reply with information used for remote identification, and the second user equipment replies with a fourth message, where the fourth message includes the information used for remote identification on the second user equipment, and the third message (Continued)

and the fourth message are encrypted by using corresponding keys.

17 Claims, 8 Drawing Sheets

(58) Field of Classification Search
CPC ..... G06F 1/3231; H04L 43/18; H04L 63/102; H04L 67/02; H04L 9/0897
See application file for complete search history.

(56) References Cited

U.S. PATENT DOCUMENTS

| | | | |
|---|---|---|---|
| 2013/0080769 A1* | 3/2013 | Cha | H04L 67/02 726/3 |
| 2018/0334138 A1* | 11/2018 | Namineni | G06F 1/3231 |
| 2019/0377864 A1 | 12/2019 | Mossoba et al. | |
| 2020/0084622 A1* | 3/2020 | Yoon | H04W 12/40 |
| 2020/0260226 A1* | 8/2020 | Moeller | H04L 9/0897 |
| 2020/0359212 A1* | 11/2020 | Chen | H04L 63/102 |
| 2020/0382961 A1* | 12/2020 | Shattil | H04L 43/18 |

FOREIGN PATENT DOCUMENTS

| | | |
|---|---|---|
| CN | 109995719 A | 7/2019 |
| CN | 110299996 A | 10/2019 |
| WO | 2019029546 A1 | 2/2019 |

OTHER PUBLICATIONS

SA WG2 Meeting #S2-136AH,S2-2000570,FS_ID_UAS-SA2: solutions for issues 1, 2 and 4,Qualcomm Incorporated,Jan. 13-17, 2020, Incheon, South Korea,total 7 pages.
3GPP TSG-SA WG1 Meeting #82, S1-181543,FS_ID_UAS: Use case for data acquisition via MNO by law enforcement,Qualcomm Incorporated,Dubrovnik, Croatia, May 7-11, 2018,total 2 pages.
SA WG2 Meeting #S2-136AH,S2-2001465,Key issues for FS_ID_UAS-SA2 ,Qualcomm Incorporated, Interdigital, Futurewei, Samsung, Motorola Mobility, Lenovo,,Jan. 13-17, 2020, Incheon, South Korea,total 2 pages.
International Search Report issued in corresponding International Application No. PCT/CN2021/079159, mailed Jun. 2, 2021, pp. 1-12.
Chinese Office Action issued in corresponding Chinese Application No. 202010231947.9, dated Mar. 2, 2022, pp. 1-20.
Chinese Notice of Allowance issued in corresponding Chinese Application No. 202010231947.9, dated Aug. 18, 2022, pp. 1-5.

* cited by examiner

COMMUNICATION METHOD, APPARATUS, AND SYSTEM FOR VERIFYING IDENTITY OF USER EQUIPMENT BY NETWORK DEVICE

CROSS-REFERENCE TO RELATED APPLICATIONS

This application is a continuation of International Application No. PCT/CN2021/079159, filed on Mar. 4, 2021, which claims priority to Chinese Patent Application No. 202010231947.9, filed on Mar. 27, 2020. The disclosures of the aforementioned applications are hereby incorporated by reference in their entireties.

TECHNICAL FIELD

This application relates to the field of wireless communication technologies, and in particular, to a communication method, apparatus, and system.

BACKGROUND

A viewpoint that a mobile communication network is used to implement communication between an unmanned aerial vehicle and another device draws attention. For example, remote identification is performed in a communication process of an unmanned aerial system. Remote identification means that the unmanned aerial vehicle or a controller can provide identification information such as an identity and a position of the unmanned aerial vehicle or the controller when the unmanned aerial vehicle is flying, so that another device on the ground or in a space domain in which the unmanned aerial vehicle is located can determine the information such as the identity and the position of the unmanned aerial vehicle or the controller, to supervise the unmanned aerial system, and reduce a potential security risk brought by the unmanned aerial system.

However, no corresponding solution is proposed in the conventional technology. Therefore, how to implement communication when the unmanned aerial system is combined with the mobile communication network, and in particular, how to securely and efficiently perform communication (for example, send remote identification information) is still an urgent problem to be resolved.

SUMMARY

This application provides a communication method, apparatus, and system, to implement communication when an unmanned aerial system is combined with a mobile communication network, and achieve secure and efficient communication.

According to a first aspect, an embodiment of this application provides a communication method, including: A first network device receives a first message sent by first user equipment, where the first message is used to request to perform identity verification on second user equipment; the first network device verifies whether an identity of the second user equipment is valid; and the first network device sends a verification result to the first user equipment, where the verification result indicates whether the identity of the second user equipment is valid.

The first network device may include an unmanned aerial system traffic management UTM/unmanned aerial system service supplier USS function that is newly added to a mobile communication system.

According to the foregoing method, in a communication process, user equipment in an unmanned aerial system may request, by taking advantage of a mobile communication network, a network device to assist in performing identity verification on the user equipment, and then may securely receive and send a message (where the message may further be encrypted by using a key or a security parameter), so that a leakage of sensitive information of an unmanned aerial vehicle can be effectively avoided. In addition, if the received message and the sent message are encrypted by using a symmetric key, a symmetric key computation amount is less, and efficiency in the communication process can be ensured.

In a possible design, the first message includes a first credential 1 used to verify the first user equipment. Before the first network device verifies whether an identity of the second user equipment is valid, the first network device may further verify validity of the first user equipment based on the first credential. That the first network device verifies whether an identity of the second user equipment is valid includes: If verifying that the first user equipment is valid, the first network device verifies, based on the first message, whether the identity of the second user equipment is valid.

In this design, before executing a request of the first user equipment, the network device may further first perform identity verification on the first user equipment, and then process the request of the first user equipment when ensuring that the first user equipment is valid. This can further ensure security of the communication process, and can further avoid a waste of processing resources of the network device.

In a possible design, after authentication between the first network device and the first user equipment succeeds, the first network device may further generate a second credential for the first user equipment, and/or the first network device may further receive a second credential generated by the first user equipment. That the first network device verifies validity of the first user equipment based on the first credential includes: The first network device determines validity of the first user equipment based on the first credential and the second credential.

In a possible design, the first message includes identification information of the second user equipment, and the identification information of the second user equipment is a temporary identifier. That the first network device verifies whether an identity of the second user equipment is valid includes: The first network device determines a permanent identifier of the second user equipment based on the temporary identifier of the second user equipment; and the first network device verifies, based on the permanent identifier of the second user equipment, whether the second user equipment is authenticated or authorized.

In a possible design, the first message includes information used for remote identification on the second user equipment. The method further includes: The first network device may further receive information that is from the second user equipment and that is used for remote identification on the second user equipment. That the first network device verifies whether an identity of the second user equipment is valid includes: The first network device determines whether the information that is from the second user equipment and that is used for remote identification on the second user equipment is consistent with the information that is included in the first message and that is used for remote identification on the second user equipment.

According to a second aspect, an embodiment of this application further provides a communication method, including: First user equipment receives a second message sent by second user equipment; the first user equipment sends a first message to a first network device in response to the second message, where the first message is used to request to perform identity verification on the second user equipment; and the first user equipment receives a verification result sent by the first network device, and if the verification result indicates that an identity of the second user equipment is valid, the first user equipment processes the second message.

According to the foregoing method, in a communication process, user equipment in an unmanned aerial system may request, by taking advantage of a mobile communication network, a network device to assist in performing identity verification on the user equipment, and then may securely receive and send a message (where the message may further be encrypted by using a key or a security parameter), so that a leakage of sensitive information of an unmanned aerial vehicle can be effectively avoided. The second user equipment broadcasts the second message, and the second message is encrypted by using a symmetric key. This ensures security in the communication process, and avoids frequently pre-configuring a large quantity of certificates for the second user equipment. In addition, compared with an asymmetric public-private key pair, a computation amount in an encryption and/or decipherment process of the symmetric key is less, so that efficiency in the communication process can be improved.

In a possible design, the second message includes identification information of the second user equipment and/or information used for remote identification on the second user equipment. The first message includes one or more of the following: the identification information of the second user equipment, a first credential used to verify the first user equipment, the second message, or the information used for remote identification on the second user equipment.

In a possible design, after authentication between the first network device and the first user equipment succeeds, the first user equipment may further receive a second credential generated by the first network device and/or a second credential generated by the first user equipment.

The second credential generated by the first network device is the same as the second credential generated by the first user equipment.

In a possible design, the sending a first message to a first network device includes: sending the first message to the first network device for one or more received second messages broadcast by one or more second user equipment, where the first message is specifically used to request to perform identity verification on the one or more second user equipment.

In this design, the first user equipment may aggregate the second messages broadcast by the one or more second user equipment. Specifically, the first user equipment may wait for preset duration, and aggregate the second messages that are broadcast by the one or more second user equipment and that are received in the preset duration. Alternatively, after receiving one or more second messages broadcast by a specified quantity of second user equipment, the first user equipment may aggregate the second messages broadcast by the specified quantity of second user equipment.

In a possible design, before the sending a first message to a first network device, the first user equipment may further determine, based on the second message, whether a distance between the first user equipment and the second user equipment is within a preset distance range. That the first user equipment sends a first message to a first network device includes: If the distance between the first user equipment and the second user equipment is within the preset distance range, the first user equipment sends the first message to the first network device.

In this design, the first user equipment may filter the second message (or the second user equipment) in advance based on the distance between the first user equipment and the second user equipment, and does not respond to the second user equipment whose distance from the first user equipment is not within the preset distance range, to save processing resources and ensure high efficiency in the communication process.

In a possible design, before the sending a first message to a first network device, the method further includes:

The first user equipment determines, based on the second message, whether time at which the second user equipment broadcasts the second message is within a preset time range.

That the first user equipment sends a first message to a first network device includes:

If the time at which the second user equipment broadcasts the second message is within the preset time range, the first user equipment sends the first message to the first network device.

In this design, the first user equipment may filter the second message (or the second user equipment) in advance based on time at which the second user equipment broadcasts the second message, and does not respond to the second user equipment that broadcasts the second message at time that is not within the preset time range, to save processing resources and ensure high efficiency in the communication process.

According to a third aspect, an embodiment of this application further provides a communication method, including: Second user equipment encrypts a to-be-sent second message based on a symmetric key generated for a second network device when the second user equipment accesses a network; and the second user equipment broadcasts an encrypted second message.

The second network device may include an access and mobility management function AMF/unified data management UDM, or an AMF/UDM and UTM/a USS.

According to the foregoing method, the second user equipment broadcasts the second message, and the second message is encrypted by using the symmetric key. This ensures security in a communication process, and avoids frequently pre-configuring a large quantity of certificates for the second user equipment. In addition, compared with an asymmetric public-private key pair, a computation amount in an encryption and decipherment process of the symmetric key is less, so that efficiency in the communication process can be improved.

In a possible design, that second user equipment encrypts a to-be-sent second message based on a symmetric key generated for a second network device when the second user equipment accesses a network includes: The second user equipment encrypts the to-be-sent second message by using the symmetric key generated for the second network device when the second user equipment accesses the network; or the second user equipment performs derivation based on the symmetric key generated for the second network device when the second user equipment accesses the network, to generate a subkey of the symmetric key, and the second user equipment encrypts the to-be-sent second message by using the subkey.

In this design, a key for encrypting the second message may be the symmetric key generated for the second network device when the second user equipment accesses the network, or may be the subkey that is generated through derivation based on the symmetric key.

In a possible design, the second user equipment may further send, to the second network device, a derivation parameter and/or a derivation algorithm used to generate the subkey.

In a possible design, the second message includes identification information of the second user equipment and/or information used for remote identification on the second user equipment.

The identification information of the second user equipment includes a temporary identifier of the second user equipment and/or a permanent identifier of the second user equipment. The information used for remote identification on the second user equipment includes one or more of the following: position information of the second user equipment, time at which the second user equipment broadcasts the second message, a manufacturer of the second user equipment, or an operator accessed by the second user equipment (or an operator to which a mobile communication network belongs).

According to a fourth aspect, an embodiment of this application further provides a communication method, including: A second network device receives a first message sent by first user equipment, where the first message is used to request to perform identity verification on second user equipment; the second network device verifies whether an identity of the second user equipment is valid; and the second network device sends a verification result to the first user equipment, where the verification result indicates whether the identity of the second user equipment is valid.

According to the foregoing method, the second user equipment broadcasts a second message, and the second message is encrypted by using a symmetric key. This ensures security in a communication process, and avoids frequently pre-configuring a large quantity of certificates for the second user equipment. In addition, compared with an asymmetric public-private key pair, a computation amount in an encryption and decipherment process of the symmetric key is less, so that efficiency in the communication process can be improved. In addition, by taking advantage of a 3GPP network, identity verification is first performed on an unmanned aerial vehicle or an inspection device, and then a message is securely received and sent (that is, encrypted by using a key or a security parameter), so that a leakage of sensitive information of the unmanned aerial vehicle can be effectively avoided.

In a possible design, the second network device may further receive an encrypted second message from the second user equipment.

The second message is encrypted by using a symmetric key generated for the second network device when the second user equipment accesses a network; or the second message is encrypted by using a subkey that is generated through derivation based on the symmetric key.

In a possible design, the first message includes one or more of the following: identification information of the second user equipment, a first credential used to verify the first user equipment, the second message, or information used for remote identification on the second user equipment.

The second message includes the identification information of the second user equipment and/or the information used for remote identification on the second user equipment.

In a possible design, the first message is further used to request a key used by the second user equipment to encrypt the second message; the first message is further used to request a derivation parameter and/or derivation algorithm for generating a subkey used by the second user equipment to encrypt the second message; and/or the first message is further used to request the second network device to decipher the second message.

The verification result further includes the key used by the second user equipment to encrypt the second message, the derivation parameter and/or derivation algorithm for generating the subkey used by the second user equipment to encrypt the second message, and/or a deciphered second message.

In a possible design, the second network device may further receive, from the second user equipment, the derivation parameter and/or derivation algorithm used to generate the subkey. The second network device generates the subkey of the symmetric key based on the symmetric key generated for the second network device when the second user equipment accesses the network and the derivation parameter and/or derivation algorithm used to generate the subkey.

In a possible design, the first message includes a first credential used to verify the first user equipment. Before the second network device verifies whether an identity of the second user equipment is valid, the second network device may further verify validity of the first user equipment based on the first credential. That the second network device verifies whether an identity of the second user equipment is valid includes: If verifying that the first user equipment is valid, the second network device verifies, based on the first message, whether the identity of the second user equipment is valid.

In this design, before executing a request of the first user equipment, a network device may further first perform identity verification on the first user equipment, and then process the request of the first user equipment when ensuring that the first user equipment is valid. This can further ensure security of the communication process, and can further avoid a waste of processing resources of the network device.

In a possible design, after authentication between the second network device and the first user equipment succeeds, the second network device may further generate a second credential for the first user equipment, and/or the second network device may further receive a second credential generated by the first user equipment. That the second network device verifies validity of the first user equipment based on the second credential includes: The second network device determines validity of the first user equipment based on the first credential and the second credential.

In a possible design, the first message includes identification information of the second user equipment, and the identification information of the second user equipment is a temporary identifier. That the second network device verifies whether an identity of the second user equipment is valid includes: The second network device determines a permanent identifier of the second user equipment based on the temporary identifier of the second user equipment; and the second network device verifies, based on the permanent identifier of the second user equipment, whether the second user equipment is authenticated or authorized.

In a possible design, the first message includes information used for remote identification on the second user equipment. The second network device may further receive information that is from the second user equipment and that is used for remote identification on the second user equipment. That the second network device verifies whether an identity of the second user equipment is valid includes: The second network device determines whether the information that is from the second user equipment and that is used for remote identification on the second user equipment is consistent with the information that is included in the first message and that is used for remote identification on the second user equipment.

According to a fifth aspect, an embodiment of this application further provides a communication method, including: First user equipment receives a second message broadcast by second user equipment, where the second message is encrypted based on a symmetric key generated for a second network device when the second user equipment accesses a network; the first user equipment sends a first message to the first network device in response to the second message, where the first message is used to request to perform identity verification on the second user equipment; and the first user equipment receives a verification result sent by the first network device, and if the verification result indicates that an identity of the second user equipment is valid, the first user equipment processes the second message.

According to the foregoing method, in a communication process, user equipment in an unmanned aerial system may request, by taking advantage of a mobile communication network, a network device to assist in performing identity verification on the user equipment, and then may securely receive and send a message (where the message may further be encrypted by using a key or a security parameter), so that a leakage of sensitive information of an unmanned aerial vehicle can be effectively avoided. The second user equipment broadcasts the second message, and the second message is encrypted by using a symmetric key. This ensures security in the communication process, and avoids frequently pre-configuring a large quantity of certificates for the second user equipment. In addition, compared with an asymmetric public-private key pair, a computation amount in an encryption and decipherment process of the symmetric key is less, so that efficiency in the communication process can be improved.

In a possible design, the second message includes identification information of the second user equipment and/or information used for remote identification on the second user equipment.

The first message includes one or more of the following: the identification information of the second user equipment, a first credential used to verify the first user equipment, the second message, or the information used for remote identification on the second user equipment.

In a possible design, the first message is further used to request a key used by the second user equipment to encrypt the second message; the first message is further used to request a derivation parameter and/or derivation algorithm for generating a subkey used by the second user equipment to encrypt the second message; and/or the first message is further used to request the second network device to decipher the second message.

The verification result further includes the key used by the second user equipment to encrypt the second message, the derivation parameter and/or derivation algorithm for generating the subkey used by the second user equipment to encrypt the second message, and/or a deciphered second message.

In a possible design, after authentication between the second network device and the first user equipment succeeds, the first user equipment may further receive a second credential generated by the second network device and/or the first user equipment may further generate a second credential.

A second credential generated by the second network device is the same as the second credential generated by the first user equipment.

In a possible design, the sending a first message to the second network device includes: sending the first message to the first network device for one or more received second messages broadcast by one or more second user equipment, where the first message is specifically used to request to perform identity verification on the one or more second user equipment.

In a possible design, before the sending a first message to the second network device, the first user equipment may further determine, based on the second message, whether a distance between the first user equipment and the second user equipment is within a preset distance range. That the first user equipment sends a first message to the second network device includes: If the distance between the first user equipment and the second user equipment is within the preset distance range, the first user equipment sends the first message to the second network device.

In a possible design, before the sending a first message to the second network device, the first user equipment may further determine, based on the second message, whether time at which the second user equipment broadcasts the second message is within a preset time range. That the first user equipment sends a first message to the second network device includes: If the time at which the second user equipment broadcasts the second message is within the preset time range, the first user equipment sends the first message to the second network device.

According to a sixth aspect, an embodiment of this application further provides a communication method, including: Second user equipment receives a third message sent by first user equipment, where the third message is used to request the second user equipment to reply with information used for remote identification; and the second user equipment sends a fourth message to the first user equipment, where the fourth message includes information used for remote identification on the second user equipment.

The third message further includes one or more of the following: a security token token used to verify the first user equipment, identification information of the first user equipment, time at which the first user equipment sends the third message, position information of the first user equipment, cell information of the first user equipment, or signal strength of a message received by the first user equipment from a network device.

According to the foregoing method, the first user equipment may request the second user equipment to send the information used for remote identification, and the second user equipment sends the remote identification information based on the request of the first user equipment. This reduces channel resources occupied by unmanned aerial vehicle broadcasting, encrypts a message in a communication process, ensures security and efficiency of the communication process, and avoids channel resource occupation caused by continuous broadcasting by the second user equipment.

In a possible design, before the second user equipment sends a fourth message to the first user equipment, the second user equipment may further determine, based on the third message, whether a distance between the first user equipment and the second user equipment is within a preset distance range. That the second user equipment sends a fourth message to the first user equipment includes: If the distance between the first user equipment and the second user equipment is within the preset distance range, the second user equipment sends the fourth message to the first user equipment.

In this design, the second user equipment may filter the third message (or the first user equipment) in advance based on the distance between the second user equipment and the first user equipment, and does not respond to the first user equipment whose distance from the second user equipment is not within the preset distance range, to save processing resources and ensure high efficiency in the communication process.

In a possible design, before the second user equipment sends a fourth message to the first user equipment, the second user equipment may further determine, based on the third message, whether the first user equipment is in a cell in which the second user equipment is located or is in a neighboring cell of the cell in which the second user equipment is located. That the second user equipment sends a fourth message to the first user equipment includes: If the first user equipment is in the cell in which the second user equipment is located or is in the neighboring cell of the cell in which the second user equipment is located, the second user equipment sends the fourth message to the first user equipment.

In this design, the second user equipment may filter the third message (or the first user equipment) in advance based on whether the first user equipment is in the cell in which the second user equipment is located or the neighboring cell, and does not respond to the first user equipment that is not in the cell in which the second user equipment is located or the neighboring cell, to save processing resources and ensure high efficiency in the communication process.

In a possible design, before the second user equipment sends a fourth message to the first user equipment, the second user equipment may further send a fifth message to the network device, where the fifth message indicates the network device to verify validity of the first user equipment. The second user equipment receives a sixth message sent by the network device, where the sixth message indicates whether an identity of the first user equipment is valid.

In this design, the second user equipment may request, by taking advantage of a mobile communication network, the network device to assist in performing identity verification on the user equipment, and then may securely receive and send a message, so that a leakage of sensitive information of the unmanned aerial vehicle can be effectively avoided.

In a possible design, the sixth message further includes a public key of the first user equipment, a first symmetric key generated by a second network device when the first user equipment accesses a network, or a derivation parameter and/or derivation algorithm used to generate a first subkey of the first symmetric key.

In a possible design, the third message further includes a first credential used to verify an identity of the first user equipment, and the first credential includes a token token generated for the first user equipment after authentication between the first user equipment and a first network device is performed or a digital certificate that is of the first user equipment and that is signed by the first network device, where the digital certificate includes the public key of the first user equipment.

Before the second user equipment sends a fourth message to the first user equipment, the second user equipment may further perform identity verification on the first user equipment based on the first credential, and the second user equipment determines validity of an identity of the first user equipment.

In this design, the second user equipment may verify whether the identity of the first user equipment is valid, so that security in the communication process can be ensured.

In a possible design, before the second user equipment sends a fourth message to the first user equipment, the second user equipment may further encrypt a to-be-sent fourth message by using the public key of the first user equipment; the second user equipment may encrypt a to-be-sent fourth message by using the first symmetric key generated by the network device when the first user equipment accesses the network; or the second user equipment may perform derivation based on the first symmetric key to obtain the first subkey, and encrypt a to-be-sent fourth message by using the first subkey.

According to a seventh aspect, an embodiment of this application further provides a communication method, including: First user equipment sends a third message to second user equipment, where the third message is used to request the second user equipment to reply with information used for remote identification; and the first user equipment receives a fourth message from the second user equipment, where the fourth message includes the information used for remote identification on the second user equipment.

The third message further includes one or more of the following: a first credential used to verify an identity of the first user equipment, identification information of the first user equipment, time at which the first user equipment sends the third message, a count of messages that have been sent by the first user equipment, position information of the first user equipment, cell information of the first user equipment, or signal strength of a message received by the first user equipment from a network device.

According to the foregoing method, the first user equipment may request the second user equipment to send the information used for remote identification, and the second user equipment sends the remote identification information based on the request of the first user equipment. This reduces channel resources occupied by unmanned aerial vehicle broadcasting, encrypts a message in a communication process, ensures security and efficiency of the communication process, and avoids channel resource occupation caused by continuous broadcasting by the second user equipment.

In a possible design, the first credential used to verify the identity of the first user equipment includes a token generated for the first user equipment after authentication between the first user equipment and a first network device is performed or a digital certificate that is of the first user equipment and that is signed by the first network device, where the digital certificate includes a public key of the first user equipment.

In a possible design, the fourth message is encrypted by using the public key of the first user equipment; the fourth message is encrypted by using a second symmetric key generated for a second network device when the second user equipment accesses a network; or the fourth message is encrypted by using a second subkey that is generated through derivation based on the second symmetric key.

According to an eighth aspect, this application provides a communication apparatus. The apparatus has a function of implementing the method according to any one of the foregoing aspects or the implementations of the foregoing aspects. The function may be implemented by hardware, or may be implemented by hardware by executing corresponding software. The hardware or the software includes one or more modules corresponding to the foregoing function.

According to a ninth aspect, this application provides a communication apparatus, including a processor and a memory. The memory is configured to store computer-executable instructions; and when the apparatus runs, the processor executes the computer-executable instructions stored in the memory, to enable the apparatus to perform the method according to any one of the foregoing aspects or the implementations of the foregoing aspects.

According to a tenth aspect, this application provides a communication apparatus, including units or means (means) configured to perform the steps in any one of the foregoing aspects.

According to an eleventh aspect, this application provides a communication apparatus, including a processor and an interface circuit. The processor is configured to: communicate with another apparatus through the interface circuit, and perform any method according to any one of the foregoing aspects. There are one or more processors.

According to a twelfth aspect, this application provides a communication apparatus, including a processor, configured to: be connected to a memory; and invoke a program stored in the memory, to perform the method according to any implementation of the foregoing aspects. The memory may be inside the apparatus, or may be outside the apparatus. In addition, there are one or more processors.

According to a thirteenth aspect, this application further provides a computer-readable storage medium. The computer-readable storage medium stores instructions. When the instructions are run on a computer, a processor is enabled to perform the method according to any one of the foregoing aspects.

According to a fourteenth aspect, this application further provides a computer program product including instructions. When the computer program product runs on a computer, the computer is enabled to perform the method according to any one of the foregoing aspects.

According to a fifteenth aspect, this application further provides a chip system, including a processor, configured to perform the method according to the foregoing aspects.

According to a sixteenth aspect, this application further provides a communication system, including a first network device configured to perform the method according to any one of the first aspect or the implementations of the first aspect, and first user equipment and second user equipment that are configured to perform the method according to any one of the second aspect or the implementations of the second aspect.

According to a seventeenth aspect, this application further provides a communication system, including second user equipment configured to perform the method according to any one of the third aspect or the implementations of the third aspect, a second network device configured to perform the method according to any one of the fourth aspect or the implementations of the fourth aspect, and first user equipment configured to perform the method according to any one of the fifth aspect or the implementations of the fifth aspect.

According to an eighteenth aspect, this application further provides a communication system, including second user equipment configured to perform the method according to any one of the sixth aspect or the implementations of the sixth aspect and first user equipment configured to perform the method according to any one of the seventh aspect or the implementations of the seventh aspect.

DESCRIPTION OF EMBODIMENTS

Figure 1:
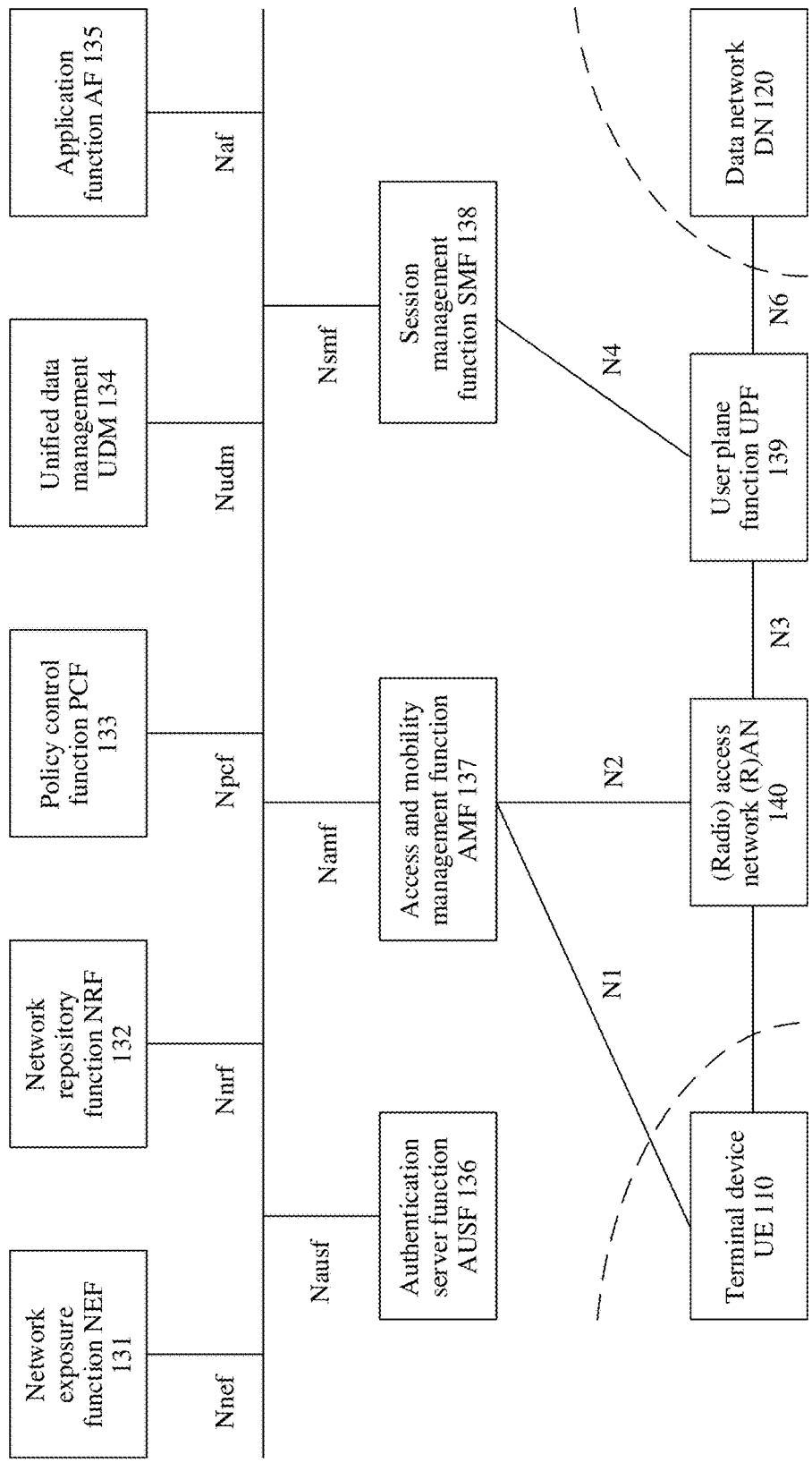
FIG. 1 is a schematic diagram of a possible network architecture according to an embodiment of this application.

The following further describes the present invention in detail with reference to accompanying drawings.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of the solutions may further be used.

In addition, the term "for example" in embodiments of this application is used to represent giving an example, an illustration, or a description. Any embodiment or design described as an "example" in this application should not be explained as being more preferred or having more advantages than another embodiment or design. Exactly, the term "example" is used to present a concept in a specific manner.

A network architecture and a service scenario described in embodiments of this application are intended to describe technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

The following describes some terms in embodiments of this application, to facilitate understanding of a person skilled in the art.

(1) An unmanned aerial system (unmanned aerial system, UAS) usually includes an unmanned aerial vehicle (unmanned aerial vehicle, UAV) and an unmanned aerial vehicle controller (UAV controller, UAVC). The unmanned aerial vehicle may fly autonomously, or the unmanned aerial vehicle may fly according to a received control instruction of the controller. The unmanned aerial vehicle and the controller may communicate with each other. For example, the controller may send a control instruction to the unmanned aerial vehicle, and the unmanned aerial vehicle may send a photographed photo or video to the controller after aerial photographing. Usually, a direct connection (point-to-point connection) between the controller and the unmanned aerial vehicle is performed by using a wireless signal (for example, Wi-Fi). The unmanned aerial vehicle controller is also referred to as a controller, a remote control device, or the like for short.

However, a mobile communication network (or a communication system) has many advantages, such as wide-area coverage, high reliability, and support for a high-speed mobile service. If the unmanned aerial system is combined with the mobile communication network, the unmanned aerial system may implement highly reliable beyond-line-of-sight flight. However, in the conventional technology, there is no solution for combining an unmanned aerial system with a mobile communication network to implement communication. Especially, after the unmanned aerial system is combined with the mobile communication system, how to implement reliable supervision needs more attention, so that safety of the unmanned aerial system and public safety (including flight-related safety (Safety) and information-related security (Security)) are ensured, and events such as interference of an unmanned aerial vehicle to flight operation of an aircraft and a terrorist attack initiated by using the unmanned aerial vehicle are prevented.

(2) Remote identification means that the unmanned aerial vehicle or the controller may provide identification information (such as identity information, position information, and time information) when the unmanned aerial vehicle is flying, so that another device on the ground and/or in a space domain in which the unmanned aerial vehicle is located can determine information such as an identity and a position of the unmanned aerial vehicle or the controller. The identity information may include one or more of an identification number of the unmanned aerial vehicle (for example, a UAV-ID), an identification number of the controller (for example, a UAVC-ID), or an identification number of an unmanned aerial system (for example, a UAS-ID). After the unmanned aerial vehicle accesses the mobile communication network, the mobile communication network may allocate an identification number or a subscription identification number (for example, referred to as a UE-ID) to the unmanned aerial vehicle. The UAV-ID is different from the UE-ID. In other words, one unmanned aerial vehicle may correspond to two or more identification numbers (for example, the UAV-ID and the UE-ID). The position information may be represented by one or more types of information such as longitude information, latitude information, or an atmospheric pressure. The time information may be a timestamp or the like when the unmanned aerial vehicle sends the identification information. The identification information may further include information such as a manufacturer of the unmanned aerial vehicle and/or an operator accessed by the unmanned aerial vehicle. The operator accessed by the unmanned aerial vehicle may be an operator to which the mobile communication network accessed by the unmanned aerial vehicle belongs.

(3) A network device is a device that can provide a wireless access function for a terminal. The network device may support at least one wireless communication technology, for example, long term evolution (long term evolution, LTE), new radio (new radio, NR), or wideband code division multiple access (wideband code division multiple access, WCDMA).

For example, the network device may include an access network device. For example, the network device includes but is not limited to: a next generation base station or a next generation NodeB (generation NodeB, gNB) in a 5th generation (5th generation, 5G) mobile communication system, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a transmission reception point (transmission reception point, TRP), a transmission point (transmission point, TP), a mobile switching center, a small cell, a pico cell, and the like. Alternatively, the network device may be a radio controller, a centralized unit (centralized unit, CU), and/or a distributed unit (distributed unit, DU) in a cloud radio access network (cloud radio access network, CRAN) scenario, or the network device may be a relay station, an access point, a vehicle-mounted device, a terminal, a wearable device, a network device in future mobile communication, a network device in a future evolved public land mobile network (public land mobile network, PLMN), or the like.

For another example, the network device may include a core network (core network, CN) device, and the core network device includes, for example, an access and mobility management function (access and mobility management function, AMF).

In addition, after the unmanned aerial system is combined with the mobile communication network, the network device may further include a (newly added) device configured to manage the unmanned aerial vehicle and the controller, or a function of managing the unmanned aerial vehicle and the controller is newly added to an (existing) network device. For example, the device for managing the unmanned aerial vehicle and the controller may be referred to as an unmanned aerial system traffic management (unmanned aerial system traffic management, UTM) network function, and/or an unmanned aerial system service supplier (UAS service supplier, USS) function. The UTM/USS may store related information of the unmanned aerial system, such as authentication information. The UTM/USS may perform identity verification on the unmanned aerial vehicle and the controller based on the authentication information. The supervision department of the unmanned aerial vehicle may also supervise the unmanned aerial system through the UTM/USS, to ensure safety of flight control of the unmanned aerial vehicle and public safety. In some possible cases, the UTM/USS may have a function of remotely controlling flight of the unmanned aerial vehicle.

It should be noted that the UTM/USS may belong to or be deployed in an operator network, or may belong to or be deployed in a third-party entity. This is not limited in embodiments of this application. For ease of description, this is not distinguished in embodiments of this application, or an example in which the UTM/USS belongs to or is deployed in the operator network is used for description. It may be understood that, a communication process provided in embodiments of this application is also applicable to a scenario in which the UTM/USS belongs to or is deployed in the third-party entity.

It may be understood that, unless otherwise specified, in embodiments of this application, the network device includes at least a first network device and/or a second network device. For related descriptions of the first network device and the second network device, refer to subsequent embodiments.

(4) User equipment (user equipment, UE) refers to a device having a wireless transceiver function, and may be referred to as a terminal device, a mobile station (mobile station, MS), a mobile terminal (mobile terminal, MT), a terminal, or the like. For example, a specific form of the user equipment may be a UAV, an inspection device configured to supervise the unmanned aerial vehicle, an airborne terminal, aircraft, a high-speed railway, a vehicle-mounted terminal, or the like. Specifically, the UAV may be understood as an aerial vehicle that is operated by using a radio device for remote control or by using a built-in program and that does not carry a person. It should be noted that the terminal may support at least one wireless communication technology, for example, LTE, NR, WCDMA, or a future communication system.

(5) A credential (credential) may include one or more of a cookie, a token (token), a ticket (ticket), a key, a password, or a certificate. Optionally, the key may include a symmetric key or an asymmetric public-private key pair. In embodiments of this application, an example in which the key includes the symmetric key is mainly used for description.

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects.

"A plurality of" in this application means two or more.

In addition, it should be understood that in descriptions of this application, terms such as "first" and "second" are merely intended for purposes of description, and should not be understood as an indication or implication of relative importance, and cannot be understood as an indication or implication of a sequence.

The technical solutions of embodiments of this application may be applied to various communication systems, for example, a global system for mobile communications (global system for mobile communications, GSM), a code division multiple access (code division multiple access, CDMA) system, a WCDMA system, a general packet radio service (general packet radio service, GPRS), an LTE system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system or an NR system, and a future 6th generation communication system.

Some of the various communication systems operated by an operator may be referred to as an operator network. The operator network may also be referred to as a PLMN network, is a network established and operated by a government or an operator approved by the government to provide a land mobile communication service for the public, and is mainly a public network in which a mobile network operator (mobile network operator, MNO) provides a mobile broadband access service for a user. The operator network or the PLMN network described in embodiments of this application may be a network that meets a requirement of a 3rd generation partnership project (3rd generation partnership project, 3GPP) standard, which is referred to as a 3GPP network. Usually, the 3GPP network is operated by the operator, and includes but is not limited to a 5th generation (5th generation, 5G) mobile communication network (5G network for short), a 4th generation (4th generation, 4G) mobile communication network (4G network for short), a 3rd generation (3rd generation, 3G) mobile communication technology network (3G network for short), a 2nd generation wireless telephone technology (2nd generation wireless telephone technology, 2G) network (2G network for short), and the like. For ease of description, the operator network (for example, an MNO network) is used as an example for description in embodiments of this application.

Expansion of the mobile broadband access service is accompanied by development of MNO networks, to better support diversified business models, and meet requirements of more diversified application services and more industries. To provide better and more comprehensive services to more industries, the next generation network (that is, the 5G network) also come with network architecture adjustment from the 4G network. For example, the 5G network splits a mobility management entity (mobility management entity, MME) in the 4G network into a plurality of network functions including an AMF, a session management function (session management function, SMF), and the like.

To facilitate understanding of embodiments of this application, a 5G network architecture shown in FIG. 1 is used as an example to describe an application scenario used in this application. It may be understood that an architecture of another communication network is similar to that of the 5G network, and therefore details are not described. Refer to FIG. 1. The network architecture may include a terminal device (which may also be referred to as user equipment) part, an operator network part, and a data network (data network, DN) part.

The terminal device part includes a terminal device 110, and the terminal device 110 may also be referred to as user equipment (user equipment, UE). The terminal device 110 in embodiments of this application is a device having a wireless transceiver function, and may communicate with one or more core networks (core networks, CNs) by using an access network device that is in a (radio) access network ((radio) access network, (R)AN) 140. The terminal device 110 may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device 110 may be deployed on land, including an indoor device, an outdoor device, a handheld device, or a vehicle-mounted device, or may be deployed on a water surface (such as a ship), or may be deployed in the air (for example, on aircraft, a balloon, or a satellite). The terminal device 110 may be a cellular phone (cellular phone), a cordless phone, a session initiation protocol (session initiation protocol, SIP) phone, a smart phone (smart phone), a mobile phone (mobile phone), a wireless local loop (wireless local loop, WLL) station, a personal digital assistant (personal digital assistant, PDA), a handheld device having a wireless communication function, a computing device or another device connected to a wireless modem, a vehicle-mounted device, a wearable device, an unmanned aerial vehicle device or an internet of things, a terminal in an internet of vehicles, a terminal in any form in a 5th generation (5th generation, 5G) network and a future network, relay user equipment, a terminal in a future evolved public land mobile network (public land mobile network, PLMN), or the like. The relay user equipment may be, for example, a 5G residential gateway (residential gateway, RG). For example, the terminal device 110 may be a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. This is not limited in embodiments of this application. For ease of description, an example in which the terminal device 110 includes an unmanned aerial vehicle and an inspection device is used for description in embodiments of this application.

The operator network may include a network exposure function (network exposure function, NEF) 131, a network repository function (network repository function, NRF) 132, a policy control function (policy control function, PCF) 133, a unified data management (unified data management, UDM) network element 134, an application function (application function, AF) 135, an authentication server function (authentication server function, AUSF) 136, an AMF 137, an SMF 138, a user plane function (user plane function, UPF) 139, a (R)AN 140, and the like. In the operator network, a part other than the (R)AN 140 part may be referred to as a core network (core network, CN) or a core network part. For ease of description, in this embodiment of this application, an example in which the (R)AN 140 is a RAN is used for description.

A data network DN 120 may also be referred to as a packet data network (packet data network, PDN), and is usually a network outside the operator network, for example, a third-party network. The operator network may access a plurality of data networks DNs 120. A plurality of services may be deployed on the data network DN 120, and the data network DN 120 may provide services such as data and/or voice for the terminal device 110. For example, the data network DN 120 may be a private network of a smart factory, a sensor installed in a workshop of the smart factory may be the terminal device 110, a control server of the sensor is deployed in the data network DN 120, and the control server may provide a service for the sensor. The sensor may communicate with the control server, to obtain instructions of the control server, transmit collected sensor data to the control server according to the instructions, and the like. For another example, the data network DN 120 may be an internal office network of a company, a mobile phone or a computer of an employee of the company may be the terminal device 110, and the mobile phone or the computer of the employee may access information, data resources, and the like on the internal office network of the company.

The terminal device 110 may establish a connection to the operator network through an interface (for example, N1) provided by the operator network, and use the services such as data and/or voice provided by the operator network. The terminal device 110 may further access the data network DN 120 through the operator network, and use an operator service deployed on the data network DN 120 and/or a service provided by a third party. The third party may be a service provider other than the operator network and the terminal device 110, and may provide another service such as data and/or voice for the terminal device 110. A specific representation form of the third party may be specifically determined based on an actual application scenario, and is not limited herein.

The following briefly describes a network function in the operator network.

The (R)AN 140 may be considered as a sub-network of the operator network, and is an implementation system between a service node in the operator network and the terminal device 110. To access the operator network, the terminal device 110 first passes through the (R)AN 140, and then may be connected to the service node in the operator network by using the (R)AN 140. The access network device (RAN device) in embodiments of this application is used as a device that provides a wireless communication function for the terminal device 110, and may also be referred to as a network device. The RAN device includes but is not limited to a next generation base station or NodeB (next generation NodeB, gNB) in a 5G system, an evolved NodeB (evolved NodeB, eNB) in LTE, a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a transmission reception point (transmission reception point, TRP), a transmission point (transmission point, TP), a pico (pico) base station device, a mobile switching center, a network device in a future network, or the like. It should be understood that a specific type of the access network device is not limited in this specification. In systems using different radio access technologies, devices having a function of the access network device may have different names.

The access and mobility management function AMF (which may also be referred to as an AMF network element, an AMF network function, or an AMF network function entity) 137 is a control plane network function provided by the operator network, and is responsible for access control and mobility management when the terminal device 110 accesses the operator network, for example, including functions such as mobility status management, temporary user identifier assignment, and user authentication and authorization.

The session management function SMF (which may also be referred to as an SMF network element, an SMF network function, or an SMF network function entity) 138 is a control plane network function provided by the operator network, and is responsible for managing a protocol data unit (protocol data unit, PDU) session of the terminal device 110. The PDU session is a channel used to transmit a PDU, and the terminal device needs to transmit the PDU to the data network DN 120 through the PDU session. The SMF network function 138 is responsible for establishment, maintenance, deletion, and the like of the PDU session. The SMF network function 138 includes functions related to a session, for example, session management (for example, session establishment, modification, and release, including tunnel maintenance between the user plane function UPF 139 and the (R)AN 140), selection and control of the UPF network function 139, service and session continuity (service and session continuity, SSC) mode selection, and roaming.

The user plane function UPF (which may also be referred to as a UPF network element, a UPF network function, or a UPF network function entity) 139 is a gateway provided by an operator, and is a gateway for communication between the operator network and the data network DN 120. The UPF network function 139 includes functions related to a user plane, for example, data packet routing and transmission, data packet detection, service usage reporting, quality of service (quality of service, QoS) processing, lawful interception, uplink data packet detection, and downlink data packet storage.

The unified data management UDM network element (which may also be referred to as a UDM network element, a UDM network function, or a UDM network function entity) 134 is a control plane function provided by the operator, and is responsible for storing information such as a subscription permanent identifier (subscriber permanent identifier, SUPI), a credential (credential), a security context (security context), and subscription data of a subscriber in the operator network. The SUPI is first encrypted during transmission, and an encrypted SUPI is referred to as a subscription concealed identifier (subscription concealed identifier, SUCI). The information stored in the UDM network function 134 may be used for authentication and authorization when the terminal device 110 accesses the operator network. The subscriber in the operator network may be specifically a user using a service provided by the operator network, for example, a user using a SIM card of China Telecom, or a user using a SIM card of China Mobile. The subscription permanent identifier SUPI of the subscriber may be a number of the SIM card or the like. The credential and the security context of the subscriber may be stored small files such as an encryption key of the SIM card or information related to encryption of the SIM card, and are used for authentication and/or authorization. The security context may be cookie (cookie), a token (token), or the like stored in a local terminal (for example, a mobile phone) of the user. The subscription data of the subscriber may be a supporting service of the SIM card, for example, a traffic package or a used network of the SIM card. It should be noted that the permanent identifier, the credential, the security context, the cookie (cookie), and the token are equivalent to information related to verification/authentication and authorization, and are not limited or distinguished between each other for ease of description in embodiments of this application.

The authentication server function AUSF (which may also be referred to as an AUSF network element, an AUSF network function, or an AUSF network function entity) 136 is a control plane function provided by the operator, and is usually used for primary authentication, to be specific, authentication between the terminal device 110 (the subscriber) and the operator network. After receiving an authentication request initiated by the subscriber, the AUSF network function 136 may perform authentication and/or authorization on the subscriber by using authentication information and/or authorization information stored in the UDM network function 134, or generate authentication information and/or authorization information of the subscriber by using the UDM network function 134. The AUSF network function 136 may feed back the authentication information and/or the authorization information to the subscriber.

The network exposure function NEF (which may also be referred to as an NEF network element, an NEF network function, or an NEF network function entity) 131 is a control plane function provided by the operator. The NEF network function 131 securely exposes an external interface of the operator network to the third party. When the SMF network function 138 needs to communicate with a third-party network function, the NEF network function 131 may serve as a relay for communication between the SMF network function 138 and the third-party network entity. When serving as the relay, the NEF network function 131 may translate identification information of the subscriber and identification information of the third-party network element. For example, when sending the SUPI of the subscriber from the operator network to the third party, the NEF network function 131 may translate the SUPI into an external identity (identity, ID) of the SUPI. On the contrary, when sending an external ID (an ID of the third-party network element) to the operator network, the NEF network function 131 may translate the external ID into the SUPI.

The policy control function (PCF) (which may also be referred to as a PCF network element, a PCF network function, or a PCF network function entity) 133 is a control plane function provided by the operator, and is configured to provide a policy of the PDU session for the SMF network function 138. The policy may include a charging-related policy, a QoS-related policy, an authorization-related policy, and the like.

In FIG. 1, Nnef, Nausf, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. Details are not described herein. It should be noted that in FIG. 1, only an example in which the terminal device 110 is UE is used for description. Names of interfaces between network functions in FIG. 1 are merely examples. In specific implementation, the names of the interfaces in the system architecture may be other names. This is not specifically limited in this embodiment of this application.

The mobility management network function in embodiments of this application may be the AMF network function 137 shown in FIG. 1, or may be another network function that has the AMF network function 137 in a future communication system. Alternatively, the mobility management network function in this application may be an MME in LTE or the like.

For ease of description, in embodiments of this application, an example in which the mobility management network function is the AMF network function 137 is used for description. Further, the AMF network function 137 is briefly referred to as an AMF, and the terminal device 110 is referred to as UE. In other words, in embodiments of this application, all AMFs described below may be replaced with the mobility management network function, and all UEs may be replaced with the terminal device.

The network architecture (for example, the 5G network architecture) shown in FIG. 1 uses a service-based architecture and a universal interface, and a conventional network element function is split into several self-contained, self-managed, and reusable network function service modules based on a network function virtualization (network function virtualization, NFV) technology. A service module set is flexibly defined to implement customized network function reconfiguration and form a service process through unified service invoking interfaces. The schematic diagram of the network architecture shown in FIG. 1 may be understood as a schematic diagram of a service-based 5G network architecture in a non-roaming scenario. Embodiments of this application are also applicable to a roaming scenario.

Figure 2:
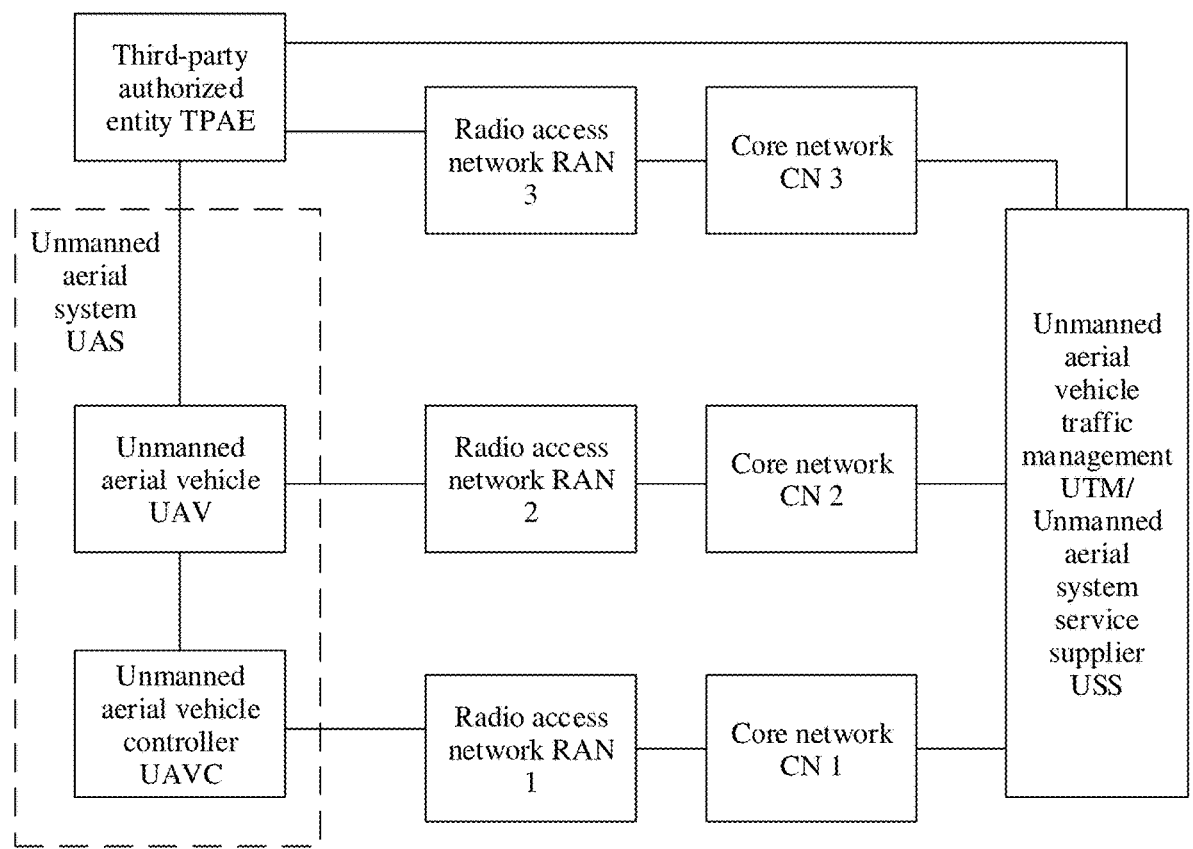
FIG. 2 is a schematic diagram of a possible network architecture according to an embodiment of this application.

Based on the network architecture shown in FIG. 1, FIG. 2 is a schematic diagram of a connection between a 5G system and an unmanned aerial system. The unmanned aerial system (UAS) includes an unmanned aerial vehicle (UAV) and an unmanned aerial vehicle controller (UAVC). The terminal device 110 may include the controller, the unmanned aerial vehicle, and a third-party authorized entity (Third-Party Authorized Entity, TPAE). The TPAE may be a newly added entity in a communication system. For example, the TPAE may include an inspector (inspector) and/or an inspection device (for convenience, the inspection device or the TPAE is usually used in embodiments of this application). The TPAE may receive a message sent by the unmanned aerial vehicle, and may be authorized to obtain identity information of the unmanned aerial vehicle. The TPAE may be connected to the UTM/USS by accessing the operator network, or may be connected to the UTM/USS in another manner (by using a non-operator network). In some possible application scenarios, the TPAE may further have a function of remotely controlling the unmanned aerial vehicle.

It should be noted that currently, the TPAE is only an entity in a 3GPP standardization research report, and a name and a function of the TPAE are not completely fixed, and may be modified in a standardization process. The name and the function of the TPAE are not limited in embodiments of this application.

The (R)AN 140 may include a RAN 1, a RAN 2, and a RAN 3. The RAN 1 is connected to the UAVC and serves the controller, the RAN 2 is connected to the unmanned aerial vehicle and serves the unmanned aerial vehicle, and the RAN 3 is connected to the TPAE and serves the TPAE. If the TPAE, the unmanned aerial vehicle, and the controller are covered by a same RAN (where RAN 3=RAN 1=RAN 2), the RAN 3, the RAN 1, and the RAN 2 may also be represented by the same (R)AN 140.

A core network in the operator network may include a CN 1, a CN 2, and a CN 3, and a specific network function/network element is not shown in FIG. 2. The CN 1 is connected to the RAN 1 and serves the RAN 1, the CN 2 is connected to the RAN 2 and serves the RAN 2, and the CN 3 is connected to the RAN 3 and serves the RAN 3. For example, when the controller controls the unmanned aerial vehicle by using the operator network, a control instruction sent by the controller may reach the unmanned aerial vehicle through a path including the RAN 1, the CN 1, the CN 2, and the RAN 2. If a same CN serves the RAN 1, the RAN 2, and the RAN 3 (where CN 1=CN 2=CN 3), the CN 1, the CN 2, and the CN 3 may also be represented by the same core network CN.

A network function UTM and/or USS may further be newly added to a core network side of the operator network. The UTM/USS may store related information of the unmanned aerial system, such as authentication information. The UTM/USS may perform identity verification on the unmanned aerial vehicle and the controller based on the authentication information. The supervision department of the unmanned aerial vehicle may also supervise the unmanned aerial system through the UTM/USS, to ensure safety of flight control of the unmanned aerial vehicle and public safety. In some possible cases, the UTM/USS may have a function of remotely controlling flight of the unmanned aerial vehicle.

In a communication process of the unmanned aerial system, remote identification on the terminal device 110 may be performed. The unmanned aerial vehicle is used as an example. Remote identification means that the unmanned aerial vehicle can provide identification information such as an identity, a position, and time during flight, so that another device on the ground or in a space domain in which the unmanned aerial vehicle is located can determine the identity and a position at a moment of the unmanned aerial vehicle. This feature is very important for supervision of the unmanned aerial system, and can reduce a potential security risk brought by the unmanned aerial system. However, no corresponding solution is proposed in the conventional technology to implement communication when the unmanned aerial system is combined with the mobile communication network. Optionally, communication may be completed with reference to the following manners. The following provides descriptions by using an example in which remote identification information is sent in a communication process.

Manner 1: Refer to a base station broadcast method in a 3GPP network. In the 3GPP network, a base station may perform broadcasting to a terminal device UE in a cell.

If the unmanned aerial vehicle makes a reference to the base station broadcast method, that is, the unmanned aerial vehicle is assumed as a base station, the unmanned aerial vehicle may perform broadcasting to a surrounding terminal device, where a broadcast message may carry the remote identification information of the unmanned aerial vehicle, for example, the identification information and/or position information of the unmanned aerial vehicle.

However, if the unmanned aerial vehicle performs broadcasting in Manner 1, the following problem exists: A message broadcast by the base station in the 3GPP network is plaintext (where encryption and integrity protection are not performed on the message). Therefore, the remote identification information carried in the broadcast message of the unmanned aerial vehicle is prone to a leakage or even malicious tampering. A broadcast channel requires a dedicated spectrum and time resource, and another device is not allowed to send a message in a broadcast time period and a frequency band. The unmanned aerial vehicle has a long flight distance and a large range, and may need to continuously perform broadcasting in a flight process. In this case, a large quantity of channel resources (including a spectrum resource and a time resource) are occupied. Therefore, the remote identification information cannot be sent securely and efficiently in Manner 1.

Manner 2: Refer to a certificate-based short range broadcast method of a V2X (vehicle to everything, for example, vehicle to everything in 3GPP or Wi-Fi) system. In the V2X system, a large quantity of public-private key pairs and certificates may be pre-configured for each vehicle. Before performing broadcasting, the vehicle first encrypts a broadcast message by using a private key corresponding to an authenticated public key in the certificate, and then broadcasts an encrypted message. To protect vehicle privacy and prevent the vehicle from being tracked, the vehicle changes a certificate and a public-private key pair in the certificate at an interval of time (for example, 5 minutes). Therefore, up to thousands of certificates need to be configured for a common vehicle at a time. When the certificates are about to be used up, certificates are configured again.

If the unmanned aerial vehicle makes a reference to the vehicle broadcasting method, that is, the unmanned aerial vehicle is assumed as a vehicle, a large quantity of certificates may also be configured in the unmanned aerial vehicle, a broadcast message is encrypted by using a private key corresponding to an authenticated public key in the certificate, and then an encrypted message is broadcast.

However, when the unmanned aerial vehicle performs broadcasting in Manner 2, the following problems exist: A large computation amount and high computation complexity are involved in encryption performed by using a private key that is in an asymmetric key, and a length of a data packet encrypted by using the asymmetric key significantly increases. Consequently, transmission overheads (overheads) are increased. The unmanned aerial vehicle has a long flight distance and a large range, and may need to continuously perform broadcasting in a flight process. In this case, a large quantity of channel resources are occupied. Therefore, the remote identification information cannot be sent efficiently in Manner 2.

In conclusion, how to implement communication when the unmanned aerial system is combined with the mobile communication network, and in particular, how to securely and efficiently perform communication (for example, send the remote identification information) is still an urgent problem to be resolved.

In view of this, this application provides a communication method to ensure secure and efficient communication. In the method, second user equipment sends a second message in a broadcast or unicast manner, where the second message is encrypted by using a symmetric key. First user equipment sends a first message to a network device in response to the second message, to request to perform identity verification on the second user equipment. The network device sends, to the first user equipment, a verification result indicating whether an identity of the second user equipment is valid. After determining that the identity of the second user equipment is valid, the first user equipment processes the second message. Because the second message is encrypted and is encrypted by using the symmetric key, and requesting, by taking advantage of the network device, the network device to assist in performing identity verification on the user equipment can avoid a leakage of sensitive information of an unmanned aerial vehicle, security and efficiency in a communication process can be ensured. Alternatively, the first user equipment requests remote identification information from the second user equipment, and the second user equipment sends, to the second user equipment based on the request of the first user equipment, the information used for remote identification, where the information used for remote identification is encrypted. In addition, the second user equipment unicasts the remote identification information as required. Therefore, security and efficiency in the communication process can also be ensured.

Figure 3:
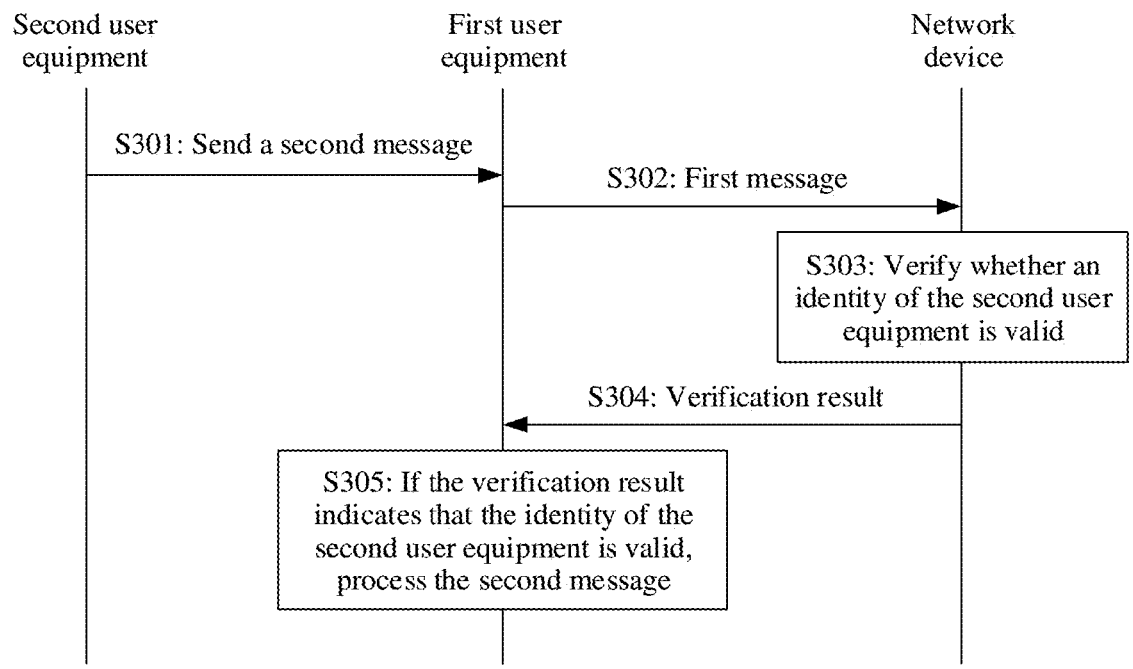
FIG. 3 is a schematic flowchart of a communication method according to an embodiment of this application.

An embodiment of this application provides a communication method. The method may be applied to the communication systems shown in FIG. 1 and FIG. 2. The following describes in detail a specific process of the communication method with reference to FIG. 3. As shown in FIG. 3, the process includes the following steps.

S301: Second user equipment sends a second message (in a broadcast or unicast manner), and first user equipment receives the second message from the second user equipment.

The second user equipment and the first user equipment are valid subscribers of a 3GPP network. For example, subscriber identity module (subscriber identity module, SIM) cards are installed in the second user equipment and the first user equipment. For example, the second user equipment may be an unmanned aerial vehicle (and/or a controller) shown in FIG. 4, and the first user equipment may be a TPAE (for example, an inspection device) shown in FIG. 4.

The second user equipment may actively broadcast the second message, or the second user equipment may broadcast or unicast the second message as required. For example, another device (for example, the first user equipment) requests remote identification information from the second user equipment, and the second user equipment broadcasts or unicasts the second message in response to the request.

Before S301, the second user equipment may encrypt a to-be-sent second message by using a second symmetric key. Optionally, the second symmetric key may be a second symmetric key generated by the second user equipment or a second symmetric key (which may also be referred to as a second shared key) generated by a first network device after authentication between the second user equipment and the first network device (for example, UTM/a USS) succeeds, or a second symmetric key (for example, a non-access stratum (Non-access stratum, NAS) key K-amf and/or an access stratum (Access stratum, AS) key K-gNB) generated for a second network device (for example, an AMF/UDM, the AMF/UDM+UTM/USS, or a gNB) when the second user equipment accesses a network (that is, registers with and accesses the 3GPP network). Alternatively, the second user equipment may encrypt the to-be-sent second message by using a second subkey that is generated through derivation based on the second symmetric key generated for the second network device when the second user equipment accesses the network, or a second subkey that is generated through derivation based on the second symmetric key generated for the second network device when the second user equipment accesses the network.

The second message includes one or more of the following information: identification information of the second user equipment, information used for remote identification on the second user equipment, or a third credential used to verify the second user equipment. The third credential may be generated by the second user equipment or the first network device after authentication between the second user equipment and the first network device succeeds. It may be understood that, based on an actual communication requirement, the second message may further include other service data.

Optionally, the second user equipment may encrypt the entire second message, or the second user equipment may encrypt a part of information in the second message, for example, protect only sensitive information (for example, the information used for remote identification on the second user equipment) in the second message.

The identification information of the second user equipment may include a temporary identifier of the second user equipment and/or a permanent identifier of the second user equipment, and there is a correspondence between the temporary identifier of the second user equipment and the permanent identifier of the second user equipment. The second user equipment and the network device may include the correspondence. The permanent identifier of the second user equipment may include a subscriber permanent identifier (subscriber permanent identifier, SUPI) used by the second user equipment in the network, an ID of the second user equipment in a UAS system (for example, an unmanned aerial vehicle ID, UAV-ID, or a controller ID, UAVC-ID), a factory sequence number of the second user equipment, or a generic public subscription identifier (generic public subscription identifier, GPSI) of the second user equipment. The temporary identifier of the second user equipment may include a pseudo-identifier obtained after randomization processing, an identifier encrypted by the UAS system, an identifier allocated by the network device (for example, the first network device or the second network device) to a session of the second user equipment, an identifier allocated by the network device (for example, the first network device or the second network device) to a navigation service of the second user equipment, or a globally unique temporary UE identity (globally unique temporary UE identity, GUTI) used by the second user equipment in the network.

The information used for remote identification on the second user equipment may also be referred to as remote identification information for short. The information used for remote identification on the second user equipment may include one or more of the following information: information about time at which the second user equipment sends the second message, position information of the second user equipment, information about a manufacturer of the second user equipment, information about an operator accessed by the second user equipment, or the like. The position information of the second user equipment may be represented by using longitude information, latitude information, atmospheric pressure information, altitude information, or the like.

Optionally, the network device (for example, the first network device or the second network device) may also receive the second message from the second user equipment. For example, the network device may receive the second message sent by the second user equipment, or the first user equipment may forward the second message (or a part of information in the second message) to the network device.

S302: The first user equipment sends a first message to the network device in response to the second message, and the network device receives the first message from the first user equipment.

The first message is used to request to perform identity verification on the second user equipment.

Figure 4:
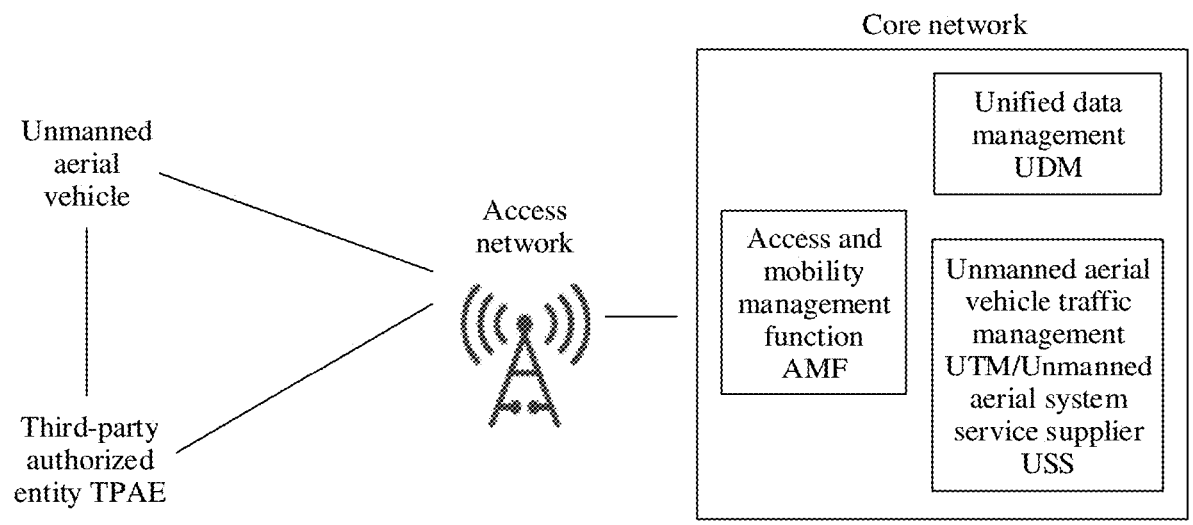
FIG. 4 is a schematic diagram of a possible network architecture according to an embodiment of this application.

As shown in FIG. 4, the network device may include the AMF/UDM and/or the UTM/USS. For example, the network device includes the first network device and the second network device, the first network device may include newly added UTM/a newly added USS, and the second network device may include the AMF/UDM, or include the AMF/UDM and the UTM/USS.

The first message may include one or more of the following: the identification information of the second user equipment, the second message, a first credential used to verify the first user equipment, or the information used for remote identification on the second user equipment. If the first message includes only the identification information of the second user equipment, a data amount of the first message is smaller, and transmission overheads are further reduced.

Optionally, after authentication or identity verification between the network device (for example, the first network device) and the first user equipment succeeds, the first user equipment receives a second credential (for example, a security token token) generated by the network device. Usually, the first credential that is included by the first user equipment in the first message and that is used to verify the first user equipment includes identity information (for example, a claim in the security token token) of the first user equipment, and includes information (for example, a digital signature of the first network device) that can be verified by the first network device. If the token is tampered with by an attacker in a transmission process, the first credential carried in the first message received by the network device cannot pass verification of the network device. Optionally, after authentication between the network device (for example, the first network device) and the first user equipment succeeds, the first user equipment and the first network device separately generate a (same) first symmetric key (which may also be referred to as a first shared key). The first user equipment generates a first credential by using the first symmetric key, where the first credential includes verification information (for example, a hash-based message authentication code (Hash-based message authentication code, HMAC)). The first network device may use the first symmetric key generated by the first network device to verify authenticity of the first credential or the verification information.

Optionally, the first user equipment may encrypt a to-be-sent first message by using the first symmetric key. The first network device deciphers the first message by using the first symmetric key generated by the first network device. If the first message can be correctly deciphered, it may be considered that the first network device successfully verifies the first user equipment.

Optionally, the first symmetric key generated after authentication between the network device (for example, the second network device) and the first user equipment succeeds may alternatively be a first symmetric key (for example, the NAS key K-amf and/or the AS key K-gNB) generated for the second network device when the first user equipment accesses a network, or a first subkey that is generated through derivation based on the first symmetric key generated for the second network device when the first user equipment accesses the network.

The first message may be further used to request a key used by the second user equipment to encrypt the second message; the first message is further used to request a derivation parameter and/or derivation algorithm and/or key identification number for generating a subkey used by the second user equipment to encrypt the second message; and/or the first message is further used to request the second network device to decipher the second message.

The first user equipment may further aggregate one or more second messages sent (for example, broadcast or unicast) by one or more second user equipment. For example, the first user equipment may send the first message to the first user equipment for the received second messages sent by the one or more second user equipment. Specifically, the first user equipment may aggregate the second messages that are sent by the one or more second user equipment and that are received in specified duration; or the first user equipment may aggregate one or more received second messages that are sent by a specified quantity of second user equipment, where the specified quantity is one or more. The first message is specifically used to request to perform identity verification on the one or more second user equipment, and the first message may include (aggregate) identification information of the one or more second user equipment. The specified duration and the specified quantity may be any values. This is not limited in this embodiment of this application.

After receiving the second messages, the first user equipment may further filter the second messages, and the first user equipment does not respond to the second message that is filtered out. In a possible implementation, the first user equipment performs filtering based on a distance between the first user equipment and the second user equipment. For example, the first user equipment determines, based on the second message, whether the distance between the first user equipment and the second user equipment is within a preset first distance range. If the distance between the first user equipment and the second user equipment is within the preset first distance range, the first user equipment sends the first message to the network device in response to the second message. The distance between the first user equipment and the second user equipment may be determined based on position information of the first user equipment and position information of the second user equipment, or may be determined based on signal strength of the received second message. The preset first distance range may be any value. This is not limited in this embodiment of this application. In another possible implementation, the first user equipment performs filtering based on time at which the second user equipment sends the second message. For example, the first user equipment determines, based on the second message, whether the time at which the second user equipment sends the second message is within a preset time range. If the time at which the second user equipment sends the second message is within the preset time range, the first user equipment sends the first message to the network device in response to the second message. The time at which the second user equipment sends the second message may be determined based on information carried in the second message, or may be determined based on time at which the first user equipment receives the second message. The preset time range may be any value. This is not limited in this embodiment of this application. In still another possible implementation, the first user equipment performs filtering based on signal strength of the second message. For example, the first user equipment determines, based on the second message, whether the signal strength of the second message is within a preset strength range. If the signal strength of the second message is within the preset strength range, the first user equipment sends the first message to the network device in response to the second message. The preset strength range may be any value. This is not limited in this embodiment of this application.

S303: The network device verifies whether an identity of the second user equipment is valid.

Optionally, the network device may further receive, from the second user equipment, a derivation parameter and/or derivation algorithm and/or key identification number used to generate a second subkey, where the derivation parameter and/or derivation algorithm and/or key identification number used to generate the second subkey may be carried in another message (not the second message). In this way, when the second message is encrypted by using the second subkey, the network device may generate the second subkey of the second symmetric key based on the second symmetric key generated for the second network device when the second user equipment accesses the network and the derivation parameter and/or derivation algorithm and/or key identification number used to generate the second subkey.

If the first message includes the first credential used to verify the first user equipment, the network device may further verify, based on the first credential, whether the first user equipment is valid. If verifying that the first user equipment is valid, the network device may verify, based on the first message, whether the identity of the second user equipment is valid. For example, the network device stores a key used to verify authenticity of the credential of the first user equipment, and the network device may further determine validity of the first user equipment based on whether the first message or the first credential can be successfully deciphered by using the key. If the first message or the first credential can be successfully deciphered by using the key, the network device determines that the first user equipment is valid; otherwise, the network device determines that the first user equipment is invalid. For another example, after authentication between the network device (for example, the first network device) and the first user equipment succeeds, or after the network device (for example, the first network device) successfully performs identity verification on the first user equipment, the network device generates a second credential (for example, a security token token) for the first user equipment. The second credential includes identity information of the first user equipment (for example, the token includes a claim including the identity information) and information (for example, a digital signature of the first network device) that can be verified by the first network device. The first network device sends a verification result to the first user equipment when authentication succeeds. The first credential used to verify the first user equipment is the same as the second credential, or includes the second credential. The network device receives the first credential of the first user equipment, and the network device verifies authenticity of the first credential based on a key for generating the second credential (for example, verifies whether the digital signature in the token is correct, and determines whether the first user equipment is valid).

For another example, after authentication between the network device (for example, the first network device) and the first user equipment succeeds, the first user equipment and the first network device separately generate a (same) first symmetric key (which may also be referred to as a first shared key). The first user equipment generates a first credential by using the first symmetric key, where the first credential includes verification information (for example, an HMAC). The first network device may use the first symmetric key generated by the first network device to verify authenticity of the first credential or the verification information (for example, the HMAC). If it is determined that the first credential or the verification information (for example, the HMAC) is correct, it may be determined that the first user equipment is valid.

If the first message includes the identification information of the second user equipment, the identification information of the second user equipment may be a temporary identifier, or may be a permanent identifier. If the identification information of the second user equipment is a temporary identifier, the network device may determine a permanent identifier of the second user equipment based on the temporary identifier of the second user equipment, and the network device may verify, based on the permanent identifier of the second user equipment, whether the second user equipment is authenticated or authorized. If determining that the second user equipment is authenticated or authorized, the network device may determine that the identity of the second user equipment is valid; otherwise, the network device may determine that the identity of the second user equipment is invalid. Optionally, if the identification information of the second user equipment is a temporary identifier, the network device may directly verify, based on the temporary identifier of the second user equipment, whether the second user equipment is authenticated or authorized. If determining that the second user equipment is authenticated or authorized, the network device may determine that the identity of the second user equipment is valid; otherwise, the network device may determine that the identity of the second user equipment is invalid. It may be understood that a verifying process in a case in which the identification information of the second user equipment is a permanent identifier may be similar to the foregoing verifying process in a case in which the identification information of the second user equipment is a temporary identifier. Details are not described herein again.

The network device may further receive information that is from the second user equipment and that is used for remote identification on the second user equipment. The information used for remote identification on the second user equipment may be carried in the second message, or may be carried in another message (not the second message). If the another message includes the information used for remote identification on the second user equipment, the network device may determine whether the information that is from the second user equipment and that is used for remote identification on the second user equipment is consistent with the information that is included in the first message and that is used for remote identification on the second user equipment. If the information that is from the second user equipment and that is used for remote identification on the second user equipment is consistent with the information that is included in the first message and that is used for remote identification on the second user equipment, the network device may determine that the identity of the second user equipment is valid; otherwise, the network device may determine that the identity of the second user equipment is invalid.

S304: The network device sends a verification result to the first user equipment, where the verification result indicates whether the identity of the second user equipment is valid. The first user equipment receives the verification result.

Corresponding to the first message, the verification result may further include the key used by the second user equipment to encrypt the second message, the derivation parameter and/or derivation algorithm and/or key identification number for generating the subkey used by the second user equipment to encrypt the second message, and/or a deciphered second message.

S305: If the verification result indicates that the identity of the second user equipment is valid, the first user equipment processes the second message.

For example, the first user equipment may decipher the second message, and/or process service data carried in the deciphered second message.

If the verification result indicates that the identity of the second user equipment is invalid, the first user equipment may not process the second message. Further, the first user equipment may trigger an application layer message to notify the inspection device.

In this embodiment, the second user equipment broadcasts the second message. If the second message is encrypted by using a symmetric key, security in a communication process may be ensured, and frequently pre-configuring a large quantity of certificates for the second user equipment is avoided. In addition, compared with an asymmetric public-private key pair, a computation amount in an encryption and decipherment process of the symmetric key is less, so that efficiency in the communication process can be improved. In addition, in this embodiment of this application, by taking advantage of the 3GPP network as much as possible, identity verification is first performed on the unmanned aerial vehicle or the inspection device, and then a message is securely received and sent (that is, encrypted by using a key or a security parameter), so that a leakage of sensitive information of the unmanned aerial vehicle can be effectively avoided.

Figure 5:
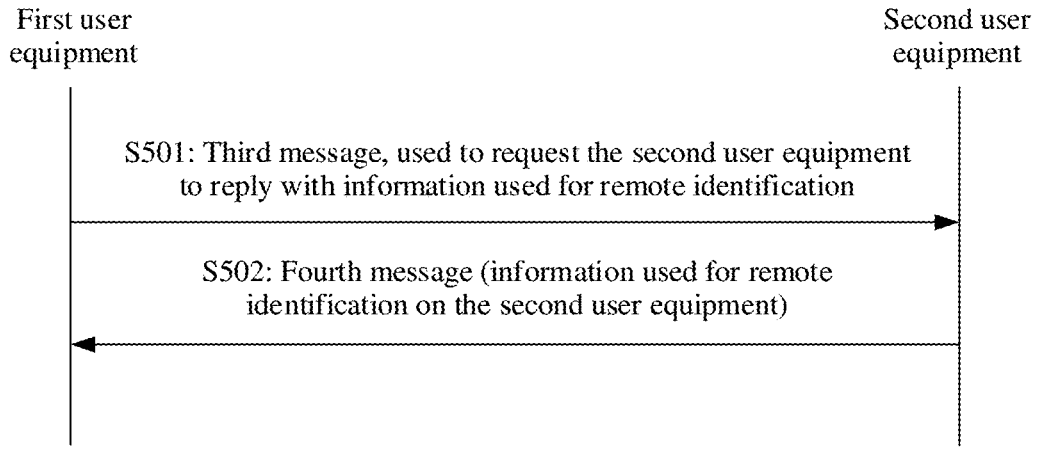
FIG. 5 is a schematic flowchart of a communication method according to an embodiment of this application.

FIG. 5 is a schematic diagram of another communication procedure according to an embodiment of this application. In FIG. 5, an unmanned aerial vehicle may perform broadcasting or unicasting as required, to alleviate a problem that a broadcast message occupies a channel resource, and further improve efficiency of a communication process. The process includes the following steps.

S501: First user equipment sends a third message to second user equipment, and the second user equipment receives the third message from the first user equipment.

The third message is used to request the second user equipment to reply with information used for remote identification.

In this embodiment, the second user equipment does not need to continuously perform broadcasting, and may perform broadcasting or unicasting as required. In other words, the second user equipment may perform broadcasting or unicasting after receiving the third message sent by the first user equipment.

Figure 6:
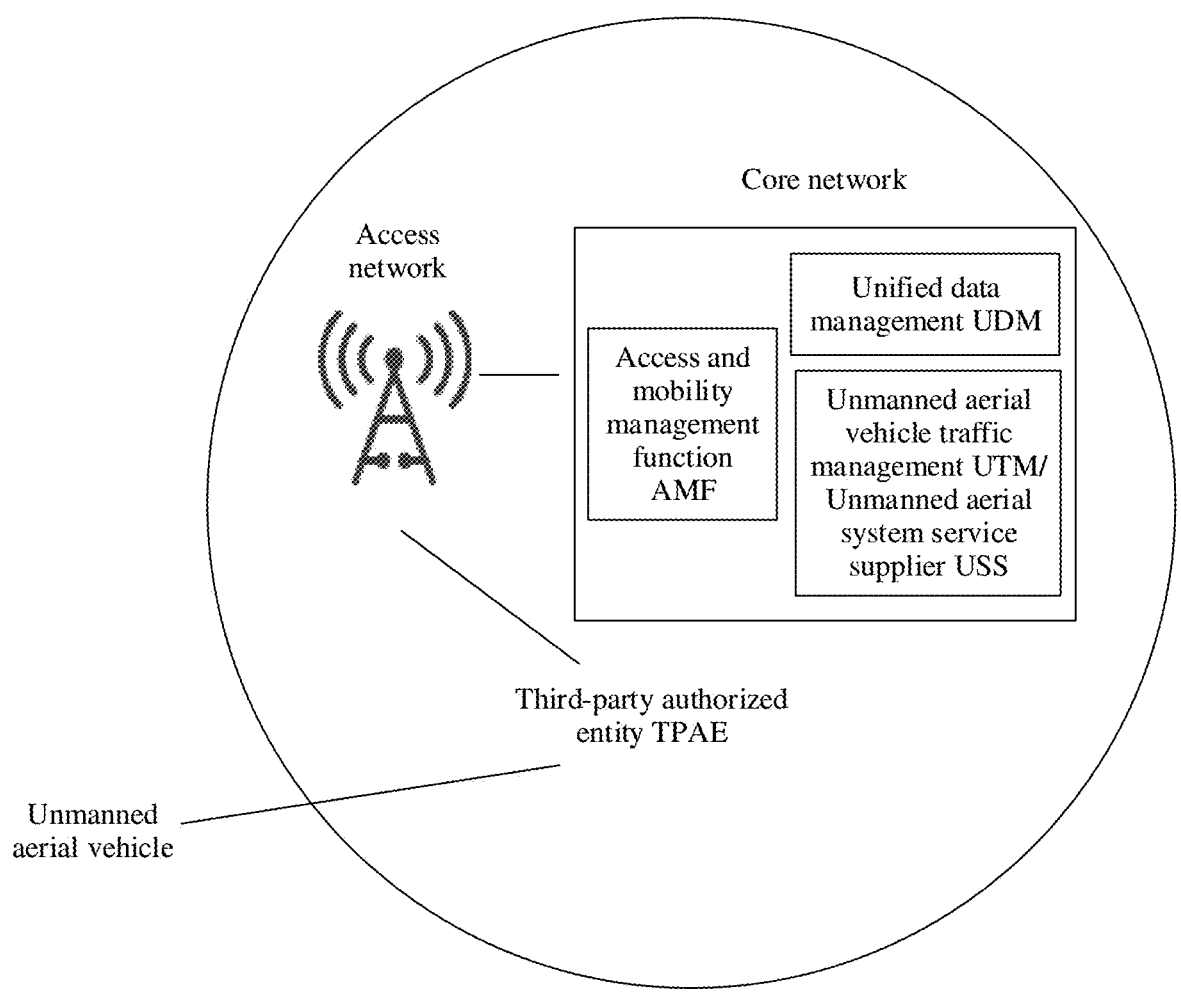
FIG. 6 is a schematic diagram of a possible network architecture according to an embodiment of this application.

Optionally, the second user equipment may be in coverage of an operator network (as shown in FIG. 4), or the second user equipment may not be in coverage of the operator network (as shown in FIG. 6).

The third message may further include one or more of the following information: a first credential used to verify an identity of the first user equipment, identification information of the first user equipment, time at which the first user equipment sends the third message, a count (count) of messages that have been sent by the first user equipment, position information of the first user equipment, cell information of the first user equipment, signal strength of a message received by the first user equipment from a network device, or information about an operator accessed by the first user equipment.

The first credential used to verify the identity of the first user equipment may include a token (token) generated for the first user equipment after authentication between the first user equipment and a first network device is performed, or a digital certificate that is of the first user equipment and that is signed by the first network device (for example, UTM/a USS). The digital certificate may include a public key of the first user equipment, and the token may include one or more of the identification information of the first user equipment, permission or a validity period of the token, and the like. The identification information of the first user equipment may include a temporary identifier of the first user equipment and/or a permanent identifier of the first user equipment. The position information of the first user equipment may be represented by using three-dimensional coordinates, longitude information, latitude information, atmospheric pressure information, height information, or the like. The cell information of the first user equipment may include cell global identifier (cell global identifier, CGI) information, and/or system information block (system information block, SIB)/master information block (master information block, MIB) information in a cell broadcast signal.

S502: The second user equipment sends a fourth message to the first user equipment, and the first user equipment receives the fourth message from the second user equipment.

The fourth message includes information used for remote identification on the second user equipment. In addition, optionally, the fourth message may be similar to the foregoing second message, and the fourth message may further include identification information of the second user equipment and/or a third credential used to verify the second user equipment. It may be understood that, based on an actual communication requirement, the fourth message may further include other service data.

Optionally, the second user equipment may encrypt the entire fourth message, or the second user equipment may encrypt a part of information in the fourth message.

The second user equipment may encrypt a to-be-sent fourth message by using the public key of the first user equipment; the second user equipment may encrypt a to-be-sent fourth message by using a symmetric subkey that is obtained through derivation based on the public key of the first user equipment; the second user equipment may encrypt a to-be-sent fourth message by using a second symmetric key generated for the network device (for example, a second network device) when the second user equipment accesses a network; the second user equipment may encrypt a to-be-sent fourth message by using a private key of the second user equipment; the second user equipment may encrypt a to-be-sent fourth message by using a second subkey that is obtained through derivation based on a second symmetric key; the second user equipment encrypts a to-be-sent fourth message by using a first symmetric key generated by the network device when the first user equipment accesses a network; or the second user equipment obtains a first subkey through derivation based on a first symmetric key, and encrypts a to-be-sent fourth message by using the first subkey.

Optionally, before sending the fourth message, the second user equipment may further determine whether to perform another operation, where the another operation may be used to alleviate attack risks such as a denial of service (which refers to a DoS denial of service attack), a relay (which refers to a relay or relay attack), and a replay (which refers to a replay attack) on a network.

Optionally, after receiving the third message, the second user equipment may further filter the third message, and the second user equipment does not reply with the fourth message for the third message that is filtered out. In a possible implementation, the second user equipment performs filtering based on a distance between the first user equipment and the second user equipment. For example, the second user equipment determines, based on the third message, whether the distance between the first user equipment and the second user equipment is within a preset second distance range. If the distance between the first user equipment and the second user equipment is within the preset second distance range, the second user equipment sends the fourth message to the first user equipment. The preset second distance range may be any value. This is not limited in this embodiment of this application. The foregoing preset first distance range may be the same as or different from the preset second distance range. In another possible implementation, the second user equipment determines, based on the third message, whether the first user equipment is in a cell in which the second user equipment is located or is in a neighboring cell of the cell in which the second user equipment is located. If the first user equipment is in the cell in which the second user equipment is located or is in the neighboring cell of the cell in which the second user equipment is located, the second user equipment sends the fourth message to the first user equipment.

The second user equipment may further aggregate one or more third messages sent by one or more first user equipment. For an aggregation process, refer to S302 in which the first user equipment aggregates the second messages sent by the one or more second user equipment. Details are not described herein again.

Before S502, the second user equipment sends a fifth message to the network device, where the fifth message indicates the network device to verify validity of the first user equipment. The network device sends a sixth message, and the second user equipment receives the sixth message sent by the network device, where the sixth message indicates whether the identity of the first user equipment is valid. If the identity of the first user equipment is valid, the second user equipment may perform S502. For a process in which the network device verifies validity of the first user equipment, refer to S303 in which the network device verifies whether an identity of the second user equipment is valid. Details are not described herein again. In this case, the second user equipment may be in the coverage of the operator network.

If the second user equipment is not in the coverage of the operator network, as shown in FIG. 6, before S502, the second user equipment may perform identity verification on the first user equipment based on the first credential, and the second user equipment determines whether the identity of the first user equipment is valid. If the identity of the first user equipment is valid, the second user equipment may perform S502.

The sixth message may further include the public key of the first user equipment, a derivation parameter and/or derivation algorithm required for obtaining a symmetric subkey through derivation based on the public key of the first user equipment, the first symmetric key generated by the second network device when the first user equipment accesses the network, or a derivation parameter and/or derivation algorithm used to generate the first subkey of the first symmetric key.

In this embodiment, the first user equipment may request the second user equipment to send the information used for remote identification, and the second user equipment sends the remote identification information based on the request of the first user equipment. This may reduce channel resources occupied by unmanned aerial vehicle broadcasting, encrypt the message in the communication process, and ensure security and efficiency of the communication process.

It may be understood that embodiments in this application may be randomly combined without conflicting with each other, to further improve security and efficiency in the communication process.

The following describes the foregoing embodiments of this application by using several detailed embodiments.

Figure 7:
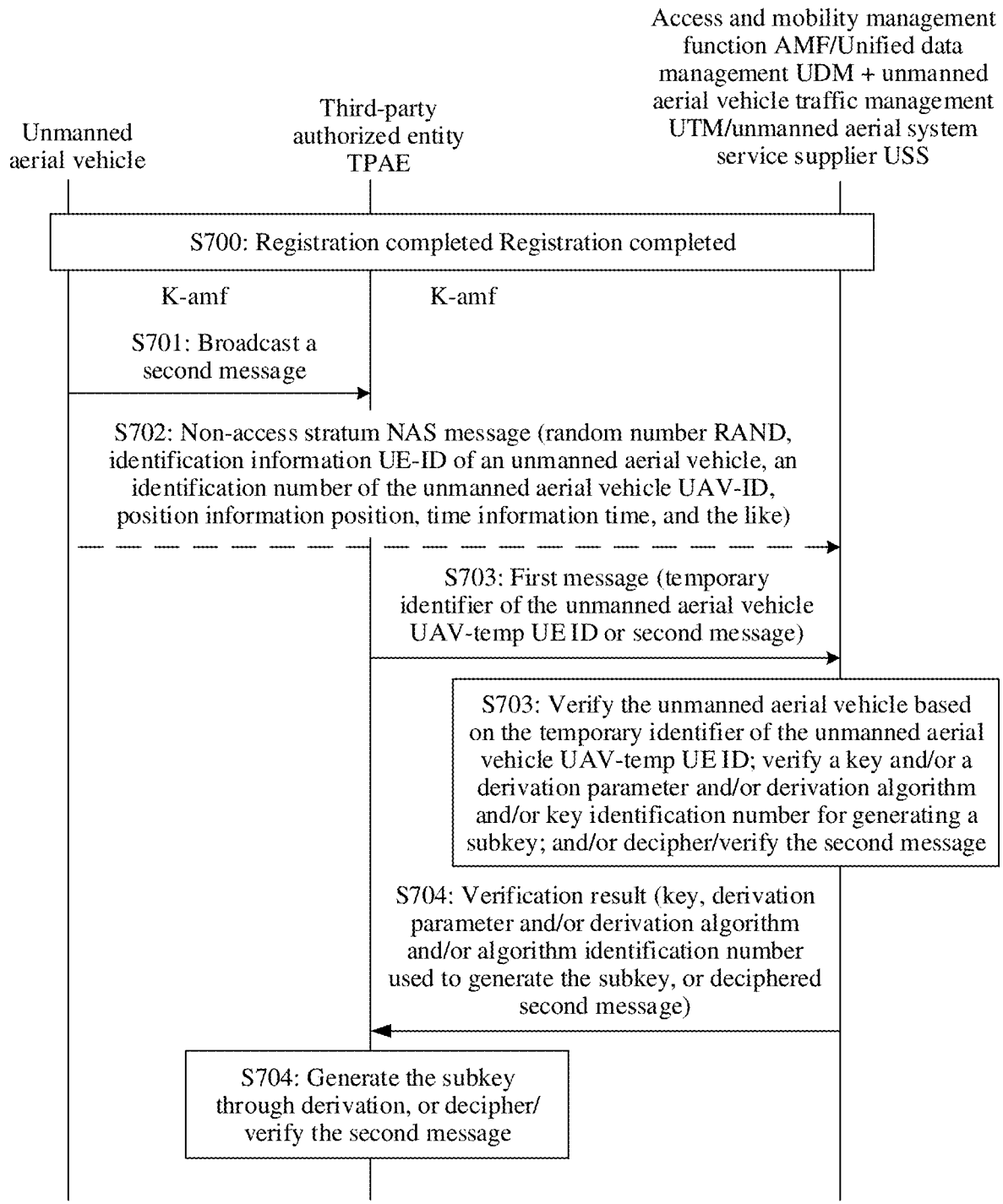
FIG. 7 is a schematic flowchart of a communication method according to an embodiment of this application.

First, refer to a schematic diagram of a communication procedure shown in FIG. 7. In FIG. 7, a 3GPP network may be used to protect a broadcast message of an unmanned aerial vehicle, and the following process is specifically included.

S700: The unmanned aerial vehicle completes registration for accessing a network (Registration completed), and succeeds in authentication of a network device (including an AMF/UDM and/or UTM/a USS).

A symmetric key used to protect communication between the unmanned aerial vehicle and the network device is generated between the network device and the unmanned aerial vehicle. The symmetric key may be, for example, a NAS key K-amf or an AS key K-gNB (where the AS key K-gNB is not shown in the figure). Optionally, a symmetric key is generated between the unmanned aerial vehicle and the UTM/USS, and the unmanned aerial vehicle and the UTM/USS separately store the symmetric key. Security protection (encryption or integrity protection) may be performed, by using the symmetric key, on a message exchanged between the unmanned aerial vehicle and the UTM/USS. It should be noted that the symmetric key is different from the NAS key K-amf or the AS key K-gNB for network authentication.

Optionally, after authentication between the unmanned aerial vehicle and the UTM/USS ends, the UTM/USS generates, for the unmanned aerial vehicle, a token (security token) used for identity verification. The token is stored in the unmanned aerial vehicle, and the UTM/USS may verify authenticity of the token. For example, the token may include a claim (claim or generation parameter): a UAV-ID, a UAV-UEID, and a UTM/USS signature. The claim part in the token indicates an attribute such as an identity of the unmanned aerial vehicle, and the signature part is used to enable another network or terminal device (for example, the UTM, the USS, the AMF, or an inspection device) to verify authenticity and integrity of the token (and the claim thereof).

Optionally, the unmanned aerial vehicle obtains, through derivation (derive) based on the symmetric key, a subkey (K-b) used for unmanned aerial vehicle broadcasting. A derivation parameter used to derive the subkey may include a random number (rand), identification information (a UE-ID) of the unmanned aerial vehicle, and/or the like.

The unmanned aerial vehicle in this embodiment of this application may be alternatively replaced with an unmanned aerial vehicle controller. In this embodiment of this application, security protection is described by using message encryption (including generating an encryption key and the like) as an example, but is also applicable to a scenario of message integrity protection (including generating an integrity protection key and the like).

S701: The unmanned aerial vehicle broadcasts (broadcast) a second message.

The second message is encrypted by using the symmetric key generated after authentication between the unmanned aerial vehicle and the network device ends in step S700. Optionally, the second message is encrypted by using a symmetric key (the NAS key K-amf or the AS key K-gNB) generated by the unmanned aerial vehicle for a first network device (for example, the AMF or a gNB). Optionally, the second message is encrypted by using a symmetric key generated after authentication between the unmanned aerial vehicle and the UTM/USS ends, and the symmetric key is different from the symmetric key generated by the unmanned aerial vehicle for the first network device. Optionally, the unmanned aerial vehicle obtains, through derivation (derive) based on any symmetric key, a subkey (K-b) used for unmanned aerial vehicle broadcasting. A derivation parameter used to derive the subkey may include a random number (rand), identification information (a UE-ID) of the unmanned aerial vehicle, and/or the like.

The second message includes information used for remote identification on the unmanned aerial vehicle (UE remote identification info), and the information used for remote identification on the unmanned aerial vehicle includes identity information (for example, the UAV-ID), position information (for example, a longitude, a latitude, a height, or an atmospheric pressure value), time information, or the like of the unmanned aerial vehicle in an unmanned aerial system. Optionally, the information used for remote identification on the unmanned aerial vehicle may be encrypted by using the subkey (encrypted by K-b).

The second message may further include identification information of the unmanned aerial vehicle in a network (for example, a temporary identifier (temp UE ID) of the unmanned aerial vehicle in the network). Usually, the identification information of the unmanned aerial vehicle in the network is different from identification information in the unmanned aerial system in the information used for remote identification on the unmanned aerial vehicle. Security protection may not be performed on the temporary identifier of the unmanned aerial vehicle by using the symmetric key or the subkey, and the temporary identifier of the unmanned aerial vehicle may be, for example, a GUTI or a newly defined (newly defined) identifier.

S702: Optionally, the unmanned aerial vehicle sends a NAS message to the network device in a unicast manner by using an operator network.

Security protection may be performed on the message by using a generated first symmetric key for communication between the unmanned aerial vehicle and the network device in step S700.

Optionally, the message may further include the derivation parameter (for example, the random number input for generating the subkey and/or the identification information of the unmanned aerial vehicle (for example, the UE-ID and/or the UAV-ID)) and/or derivation algorithm and/or key identification number used to derive the subkey for encrypting the second message in step S701, key indication information, remote identification information (including the identity information (for example, the UAV-ID), the position information position, and/or the time information time of the unmanned aerial vehicle), or the like. The key indication information may indicate whether a key type is existing or needs to be further obtained through derivation, or indicate whether the key K-amf or the key K-gNB is used.

The network device includes the AMF/UDM and the UTM/USS. In an actual communication process, the AMF may be replaced with a security anchor function (security anchor function, SEAF), an authentication credential repository and processing function (authentication credential repository and processing function, ARPF), or any combination of the SEAF and the ARPF.

Alternatively, this step may be that the network device sends a request message, and the unmanned aerial vehicle replies to the network device with the NAS message.

S703: A TPAE (for example, the inspection device) sends a first message to the network device in response to the second message. The network device receives and processes the first message.

Because the broadcast message of the unmanned aerial vehicle is protected by using a key between the unmanned aerial vehicle and the network device, and the key is shared by the unmanned aerial vehicle and the network device, but the TPAE does not store the key, the TPAE cannot decipher the second message or verify authenticity/integrity of the second message.

The first message is used to request to verify whether an identity of the unmanned aerial vehicle is valid, and/or the first message is used to request related information of the unmanned aerial vehicle (Request for UAV info). Optionally, the first message includes the temporary identifier (UAV-temp UE ID) of the unmanned aerial vehicle or the second message (broadcast msg).

Optionally, security protection may be performed on the first message by using a key between the TPAE and the network device. Optionally, the TPAE may send the first message by using another non-3GPP connection (for example, a wired network or Wi-Fi).

When the network device processes the first message, the network device may verify the unmanned aerial vehicle based on the identification information of the unmanned aerial vehicle, for example, verify whether the unmanned aerial vehicle corresponding to the identification information of the unmanned aerial vehicle is a valid unmanned aerial vehicle, for example, specifically verify whether the unmanned aerial vehicle corresponding to the identification information of the unmanned aerial vehicle is a registered and subscribed unmanned aerial vehicle and/or whether the unmanned aerial vehicle has permission to fly at a current position and current time.

Additionally/alternatively, when the network device processes the first message, the network device verifies the key and/or the derivation parameter (derivation parameter) and/or derivation algorithm and/or key identification number for generating the subkey. If the network device indicates, in the message received in S702, the used key or the derivation parameter and/or derivation algorithm and/or key identification number for generating the subkey, the network device determines and updates a corresponding key. If the network device does not receive the message in S702, the network device may determine that the unmanned aerial vehicle does not update the key.

Additionally/alternatively, when the network device processes the first message, if the network device receives the first message and/or the message sent by the unmanned aerial vehicle in S702, the network device may determine, based on the temporary identifier of the unmanned aerial vehicle, a terminal (that is, a permanent identifier) corresponding to the temporary identifier of the unmanned aerial vehicle, and determine the key used when the unmanned aerial vehicle broadcasts the message, and the network device may decipher (decipher) the second message and/or verify (verify) authenticity/integrity of the first message.

S704: The network device replies to the TPAE with a verification result. The TPAE receives and processes the verification result.

The verification result may include information indicating whether the unmanned aerial vehicle is valid. Optionally, for an invalid unmanned aerial vehicle, the verification result may further include a reason why the unmanned aerial vehicle is invalid. The reason may be, for example, that the unmanned aerial vehicle is not registered or subscribed to, or the unmanned aerial vehicle does not have flight permission at a current position or current time.

The verification result may further include the related information of the unmanned aerial vehicle, for example, the key used by the unmanned aerial vehicle, the derivation parameter and/or derivation algorithm and/or key identification number used by the unmanned aerial vehicle to generate the subkey, or a deciphered second message.

The TPAE may decipher the second message by using the key used by the unmanned aerial vehicle, or the TPAE may generate the subkey of the symmetric key by using the derivation parameter and/or derivation algorithm and/or an algorithm identification number used to generate the subkey, or the TPAE determines, based on decipherment information of the second message, whether the unmanned aerial vehicle is valid, or the like.

It should be noted that execution of step S702 may not be limited. To be specific, S702 may be performed before S701 or after the first message is sent in S703.

Figure 8:
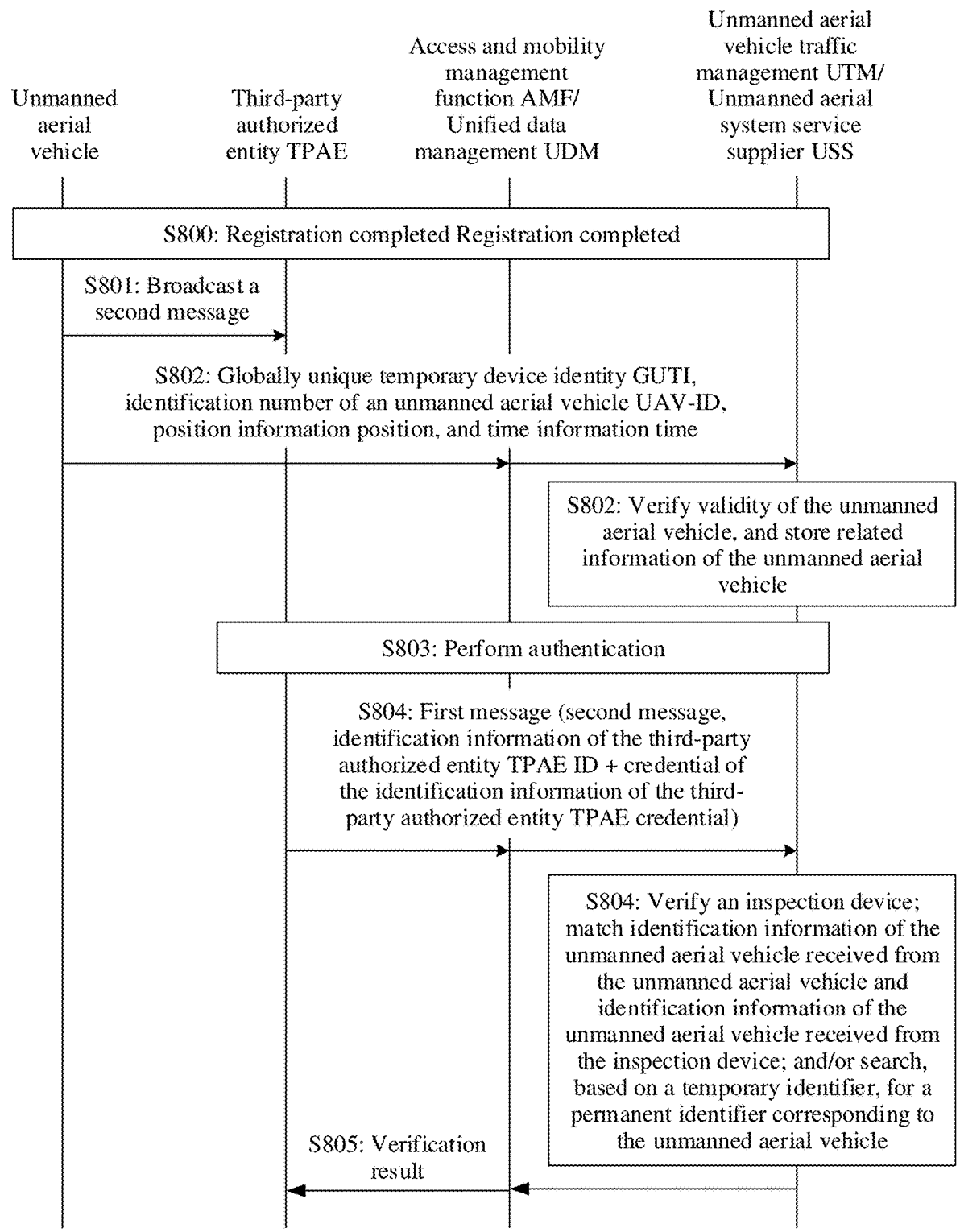
FIG. 8 is a schematic flowchart of a communication method according to an embodiment of this application.

Refer to a schematic diagram of a communication procedure shown in FIG. 8. In FIG. 8, a broadcast message may not be changed, a 3GPP network assists in remote identification, and the following steps are specifically included.

S800 is the same as S700.

S801: An unmanned aerial vehicle broadcasts a second message.

The second message includes information used for remote identification on the unmanned aerial vehicle.

It should be noted that in step S801, the unmanned aerial vehicle may broadcast the second message by not using an operator network, but using a non-3GPP technology (for example, Wi-Fi).

S802: The unmanned aerial vehicle sends a NAS message or an AS message to a first network device (for example, an AMF, a gNB, or a UPF) in a unicast manner by using the operator network. The first network device processes the message, and sends a processed NAS message to UTM/a USS. The UTM/USS verifies the unmanned aerial vehicle based on the received NAS message.

The first network device includes the AMF/UDM. In an actual communication process, the AMF may be replaced with the gNB, the UPF, or any combination of the gNB and the UPF.

The NAS message or the AS message may include a temporary identifier used by the unmanned aerial vehicle in the network and/or a permanent identifier used in the network and/or remote identification information. The remote identification information includes an identifier (a UAV-ID), position information, time information, and the like of the unmanned aerial vehicle in a UAS. The first network device may process the temporary identifier used by the unmanned aerial vehicle in the network, for example, process a GUTI to obtain a SUPI/GPSI. For example, if the UTM/USS is deployed in the operator network, the processed message may carry the SUPI. If the UTM/USS is deployed outside the operator network, the processed message may carry the GPSI. In this case, when forwarding the message, the network device may further first determine whether the UTM/USS is deployed in the operator network and then choose to carry the SUPI or the GPSI.

It should be noted that, usually, the identifier (UAV-ID) in the unmanned aerial system is different from identity information (for example, the GUTI, the SUPI, or the GPSI) in the network. The identifier in the unmanned aerial system is identity information of the unmanned aerial vehicle in the UAS, and includes a permanent identity ID (for example, a factory sequence number) of the unmanned aerial vehicle in the UAS and/or a temporary identity ID (for example, a pseudo-identity ID obtained by randomizing the permanent identity ID, and a session address/a session ID/an IP address/a navigation ID generated by the UAS (or allocated by the UAS/UTM/USS)) of the unmanned aerial vehicle in the UAS. In this embodiment of this application, a form of used permanent identity or temporary identity information is not limited.

Optionally, the unmanned aerial vehicle sends an identifier consistent with the identifier in the second message in S801. For example, if the second message includes the temporary identifier of the unmanned aerial vehicle in the UAS, the temporary identifier of the unmanned aerial vehicle in the UAS is also sent in S802. This manner has two advantages: On one hand, sending the temporary identifier of the unmanned aerial vehicle may prevent a leakage of the permanent identifier of the unmanned aerial vehicle. On the other hand, when obtaining the information used for remote identification on the unmanned aerial vehicle in the second message, the UTM/USS may more easily match messages that are from a same unmanned aerial vehicle from all received messages.

Optionally, the unmanned aerial vehicle sends only the permanent identifier in S802. For example, if the second message includes the temporary identifier of the unmanned aerial vehicle in the UAS, the permanent identifier of the unmanned aerial vehicle in the UAS is still sent in S802.

Optionally, the UTM/USS may verify whether the unmanned aerial vehicle has been authenticated by the UTM/USS or whether the unmanned aerial vehicle has been authorized by the UTM/USS to fly. For a valid unmanned aerial vehicle that has been authenticated or authorized to fly, the UTM/USS stores related information (such as current position information position and time information time) of the unmanned aerial vehicle. Optionally, if the temporary identifier of the unmanned aerial vehicle in the UAS is received, a corresponding permanent identity ID of the unmanned aerial vehicle in the UAS is found, and related information (further including a position, time, and the like) is stored.

Optionally, the UTM/USS may further verify whether network identification information of the unmanned aerial vehicle carried in the processed NAS or AS message is network identification information allowed to be used, or whether there is an authorized binding relationship (for example, in some application scenarios, a network identifier of an unmanned aerial vehicle and a UAS identifier of the unmanned aerial vehicle are valid only when they are bound). The UTM/USS stores network identification information that is allowed to be used and/or an authorized binding relationship. For another example, the UTM/USS may determine, based on the remote identification information, whether the unmanned aerial vehicle is authorized to fly at a current area and current time.

S803: Optionally, a TPAE performs authentication (authentication) with the network device and the UTM/USS.

The TPAE includes at least two types of identifiers: an identifier in the network and an identifier in the UAS. Before using the network, an inspection device needs to perform two-way authentication with the network based on the identifier in the network and generate a shared key for secure communication with the network. Optionally, to allow the TPAE to participate in remote identification on the unmanned aerial vehicle, the TPAE further needs to complete authentication that is with the UTM/USS and that is based on the identifier in the UAS. Optionally, after authentication ends, a shared key may be generated between the TPAE and the UTM/USS, and the TPAE and the UTM/USS separately stores the shard key. Security protection (encryption or integrity protection) may be performed, by using the shared key, on a message exchanged between the TPAE and the UTM/USS.

Optionally, when authentication ends, the UTM/USS generates, for the TPAE, a token (security token) used for identity verification, and sends the token to the TPAE for storage. A claim (claim) in the token may include the identifier of the TPAE in the network and the identifier of the TPAE in the UAS. The token further includes a UTM/USS signature. Another device may verify authenticity and integrity of the token based on the signature.

Optionally, S803 may occur before steps S801 and S802.

S804: The TPAE sends a first message to the UTM/USS based on the received second message. The UTM/USS receives and processes the first message.

The first message may be a forwarded message of the second message. In addition to the second message, the first message may further include identification information (a TPAE-ID) of the TPAE in the UAS and a credential (TPAE credential) used to verify the TPAE.

Optionally, the first message further includes position information of the TPAE, so that the UTM/USS may use the position information to search for an unmanned aerial vehicle (search for an unmanned aerial vehicle near a position) and/or determine whether to authorize the TPAE (for example, restrict the TPAE to obtain only information about an unmanned aerial vehicle near the TPAE, not information about an unmanned aerial vehicle at any position).

Optionally, the first message includes only identification information used for remote identification, and does not include information such as a position or time, so that a small amount of data is sent.

Optionally, after receiving the second message, the TPAE may delay sending the first message to the network. After collecting second messages from a plurality of unmanned aerial vehicles, the TPAE may forward a message that aggregates information of the plurality of unmanned aerial vehicles, to improve message sending effectiveness.

Optionally, the first message includes only information that aggregates identification information of the plurality of unmanned aerial vehicles.

If the TPAE can parse information such as a position and time in the message broadcast by the unmanned aerial vehicle, optionally, the inspection device may first determine whether the position information, the time information, or the like of the unmanned aerial vehicle in the received message broadcast by the unmanned aerial vehicle is in a proper range, and then determine whether to forward the message of the unmanned aerial vehicle. This may prevent a DoS attack on the network caused by forwarding unnecessary messages. The TPAE may restrictively forward the message of the unmanned aerial vehicle in an area based on a position of the TPAE. For example, the TPAE performs determining by calculating a distance between a position sent by the unmanned aerial vehicle and the position of the TPAE. Time may be limited in a synchronization fault tolerance range.

Optionally, the distance between the unmanned aerial vehicle and the inspection device may be estimated by using strength of a received unmanned aerial vehicle signal. Only a message in a strength range is forwarded.

It should be noted that optionally, the first message in S803 and S804 may be sent before S802.

The UTM/USS may determine whether the identification information of the unmanned aerial vehicle and the TPAE in the forwarded message is a temporary identifier (for example, a session identifier) or a permanent identifier. For example, the forwarded message includes only either the temporary identifier or the permanent identifier. The UTM/USS may pre-configure, for the unmanned aerial vehicle and the TPAE, whether to use the temporary identifier or the permanent identifier. Alternatively, a format of the temporary identifier is different from that of the permanent identifier. Alternatively, the UTM/USS stores temporary identifiers of the unmanned aerial vehicle and the TPAE. Alternatively, the forwarded message indicates whether the temporary identifier or the permanent identifier is carried. If the UTM/USS receives the temporary identifier, the UTM/USS may determine, based on information stored in the UTM/USS, the permanent identifier corresponding to the temporary identifier. Optionally, the temporary identifier may be obtained by encrypting the permanent identifier, or there is a correspondence between the temporary identifier and the permanent identifier.

When the UTM/USS processes the first message, the UTM/USS may verify whether the TPAE is authenticated/authorized/valid. For example, the UTM/USS may verify validity of the token of the TPAE, or the UTM/USS may decipher the forwarded message or perform an integrity check on the forwarded message by using a stored key corresponding to the TPAE, or the UTM/USS verifies whether a binding relationship between the SUPI/GPSI and the permanent identifier of the unmanned aerial vehicle is valid.

- the UTM/USS may match whether the identification information of the unmanned aerial vehicle received from the unmanned aerial vehicle is the same as the identification information of the unmanned aerial vehicle received from the TPAE; and/or
- the UTM/USS searches, based on the temporary identifier, for the permanent identifier (permanent ID) corresponding to the unmanned aerial vehicle, and determines whether the permanent identifier corresponding to the identification information received from the unmanned aerial vehicle is the same as the permanent identifier corresponding to the identification information received from the TPAE.

Optionally, after determining that the identification information of the unmanned aerial vehicle received from the unmanned aerial vehicle is the same as the identification information of the unmanned aerial vehicle received from the TPAE, the UTM/USS may further determine whether remote identification information received from the unmanned aerial vehicle is the same as or similar to remote identification information received from the TPAE (for example, a distance/time difference is in a range).

For S805, refer to S5704. Details are not repeated.

Figure 9:
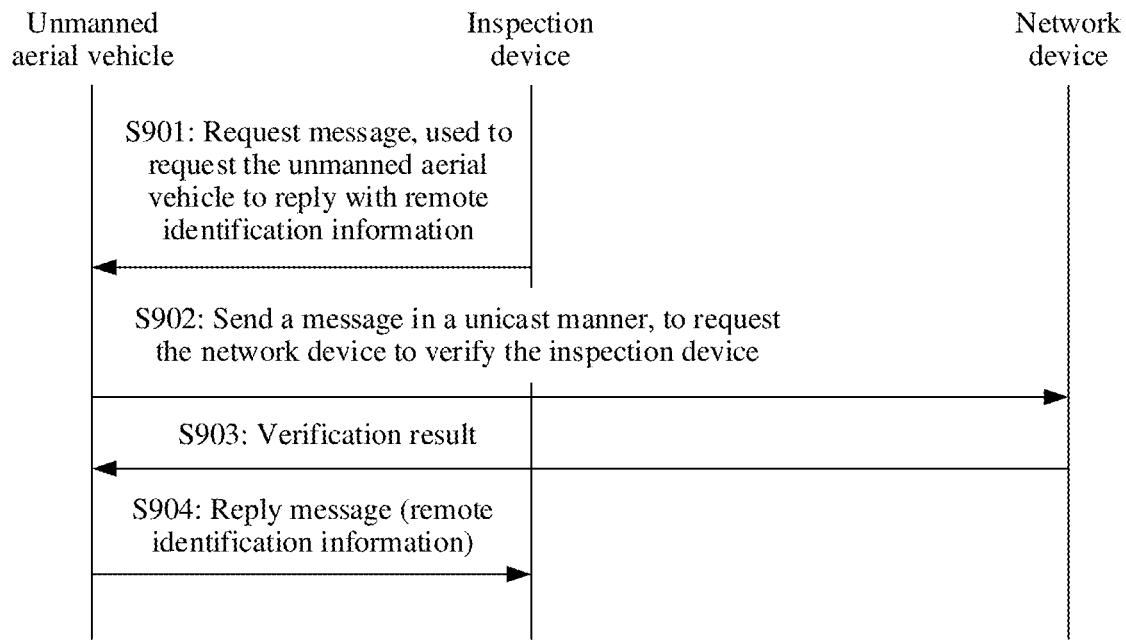
FIG. 9 is a schematic flowchart of a communication method according to an embodiment of this application.

Refer to a schematic diagram of a communication procedure shown in FIG. 9. In FIG. 9, broadcast or unicast may be performed as required, and an unmanned aerial vehicle may be in coverage of an operator network. An example in which a TPAE is an inspection device is used for description, and the following steps are specifically included.

S901: The inspection device sends a request message to the unmanned aerial vehicle, to request the unmanned aerial vehicle to reply with remote identification information, and the unmanned aerial vehicle receives the request message.

The request message may further include one or more of information used to verify an identity of the inspection device, time at which the inspection device sends the request message, a count of request messages sent by the inspection device, position information of the inspection device, cell information of the inspection device, or signal strength of a base station received by the inspection device.

Optionally, the unmanned aerial vehicle may further mitigate an attack risk by further exchanging a challenge (challenge)/response (response) message with the inspection device. The unmanned aerial vehicle may send the challenge message to the inspection device to request other information (for example, cell information (for example, a cell number CGI), a current position, measured signal strength of the unmanned aerial vehicle, and a random number) of the inspection device. If the unmanned aerial vehicle does not receive a response from the inspection device, or related information in the response message received by the unmanned aerial vehicle does not meet a predetermined condition (for example, cell numbers CGIs are not in a same cell, a position of the inspection device is far away from the unmanned aerial vehicle, a measured received signal strength cannot reach a signal strength threshold, or a result obtained through calculation based on the random number is incorrect), the unmanned aerial vehicle does not perform S902.

Optionally, after receiving the request message, the unmanned aerial vehicle does not immediately perform S902. Instead, the unmanned aerial vehicle is limited to delaying a time period to perform S902 or a frequency of performing S902 is set.

S902: The unmanned aerial vehicle sends a message to a network device in a unicast manner, where the unicast message may request the network device to verify the inspection device, and the network device receives the message unicast by the unmanned aerial vehicle.

The unmanned aerial vehicle may filter the request message based on the position of the inspection device.

The unmanned aerial vehicle may aggregate one or more request messages, and send a unicast message for the one or more request messages to the network device.

The unmanned aerial vehicle may perform security protection on the unicast message by using the key (the symmetric key or the subkey) in FIG. 7 or FIG. 8.

S903: The network device unicasts a reply message (that is, a verification result) to the unmanned aerial vehicle, and the unmanned aerial vehicle receives the unicast reply message.

The network device may filter, based on the position of the inspection device, the unicast message sent by the unmanned aerial vehicle.

The network device may aggregate one or more unicast messages sent by the unmanned aerial vehicle and then process the messages, verify the one or more unicast messages, and reply with a verification result.

The network device may verify validity and permission of the inspection device. Optionally, the network device may send, to the unmanned aerial vehicle, a key used to encrypt the request message or a parameter used to derive the key.

S904: The unmanned aerial vehicle replies to the inspection device with a message, where the message includes the remote identification information.

The unmanned aerial vehicle may perform security protection on the message by using the key obtained in S903, or drive the key by using the parameter obtained in S903, and perform security protection on the message by using the key obtained through derivation.

Figure 10:
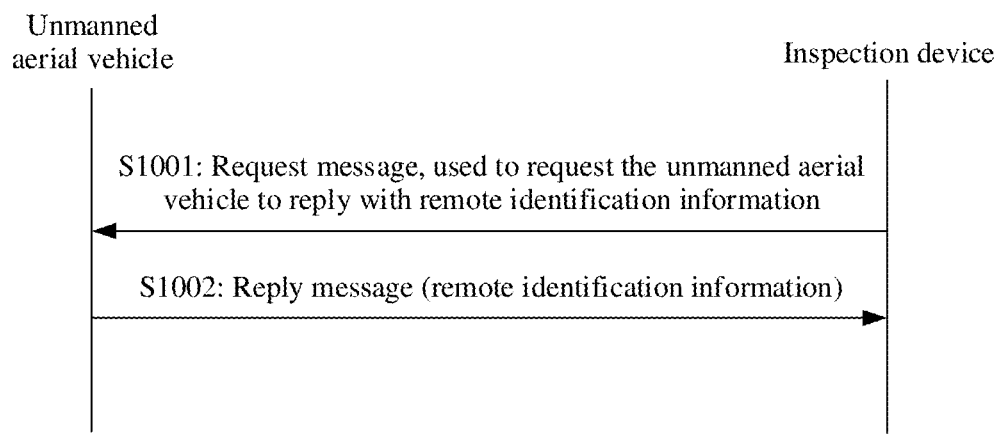
FIG. 10 is a schematic flowchart of a communication method according to an embodiment of this application.

Refer to a schematic diagram of a communication procedure shown in FIG. 10. In FIG. 10, broadcast or unicast may be performed as required, and an unmanned aerial vehicle may not be in coverage of an operator network. An example in which a TPAE is an inspection device is used for description, and the following steps are specifically included.

S1001: The inspection device sends a request message, to request remote identification information. The unmanned aerial vehicle receives the request message.

A certificate/token or a key issued by a network device may be configured in the inspection device, where a validity period of the token may be set to be short, to improve security of a communication process.

The inspection device encrypts the request message by using the key issued by the network device. The request message may further include an inspection device certificate or token signed by a network device.

S1002: The unmanned aerial vehicle replies to the inspection device with a message, where the message includes the remote identification information.

A public key or a certificate configured by the network device is pre-configured in the unmanned aerial vehicle and used as a root of trust between the unmanned aerial vehicle and the inspection device.

The unmanned aerial vehicle may perform identity verification (signature verification) and validity period verification on the certificate or the token in the request message based on the pre-configured public key. After verification succeeds, the unmanned aerial vehicle may decipher the request message by using a key in the certificate or the token.

Optionally, the message replied by the unmanned aerial vehicle may include identification information of the unmanned aerial vehicle. The identification information of the unmanned aerial vehicle may be encrypted by using a symmetric key or a subkey of the unmanned aerial vehicle in the network, and a derivation parameter and/or derivation algorithm and/or key identification number used to derive the subkey may be encrypted by using a public key of the inspection device. Alternatively, the identification information of the unmanned aerial vehicle may be encrypted by using a symmetric key generated based on the public key of the inspection device and a random number, and the random number is carried in the replied message.

Correspondingly, optionally, the inspection device receives the replied message. The inspection device may obtain the symmetric key of the unmanned aerial vehicle in the network or generate the subkey through derivation, and decipher the message by using the symmetric key or the subkey. Alternatively, the inspection device generates the symmetric key based on the key of the inspection device and the random number, and deciphers the message by using the generated symmetric key.

Figure 11:
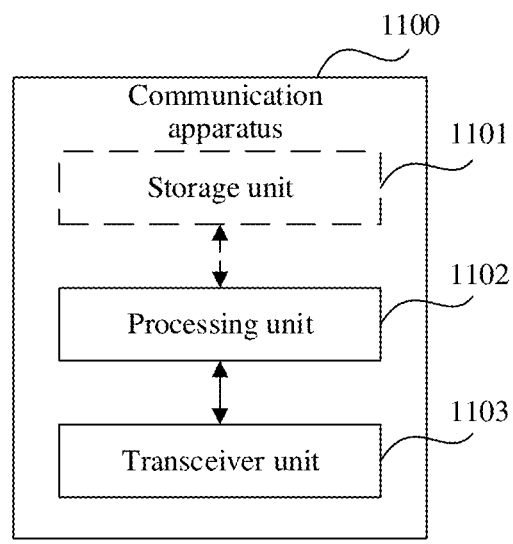
FIG. 11 is a schematic diagram of a communication apparatus according to an embodiment of this application.

FIG. 11 is a possible example block diagram of a communication apparatus in this application. The communication apparatus 1100 may exist in a form of software or hardware. The communication apparatus 1100 may include a processing unit 1102 and a transceiver unit 1103. In an implementation, the transceiver unit 1103 may include a receiving unit and a sending unit. The processing unit 1102 may be configured to control and manage an action of the communication apparatus 1100. The transceiver unit 1103 is configured to support the communication apparatus 1100 in communicating with another network entity. The communication apparatus 1100 may further include a storage unit 1101, configured to store program code and data of the communication apparatus 1100.

The processing unit 1102 may be a processor or a controller, for example, may be a CPU, a general purpose processor, a DSP, an ASIC, an FPGA, or another programmable logic device, a transistor logic device, a hardware component, or any combination thereof. The processing unit may implement or execute various example logical blocks, modules, and circuits described with reference to content disclosed in this application. The processor may alternatively be a combination of processors implementing a computing function, for example, a combination including one or more microprocessors, or a combination of the DSP and a microprocessor. The storage unit 1101 may be a memory. The transceiver unit 1103 is an interface circuit of the apparatus, and is configured to receive a signal from another apparatus. For example, when the apparatus is implemented in a form of a chip, the transceiver unit 1103 is an interface circuit used by the chip to receive a signal from another chip or apparatus, or is an interface circuit used by the chip to send a signal to another chip or apparatus.

The communication apparatus 1100 may be the user equipment and/or the network device in any one of the foregoing embodiments, or may be a chip used in the user equipment and/or the network device. For example, when the communication apparatus 1100 is the user equipment and/or the network device, the processing unit 1102 may be, for example, a processor, and the transceiver unit 1103 may be, for example, a transceiver. Optionally, the transceiver may include a radio frequency circuit, and the storage unit may be, for example, a memory. For example, when the communication apparatus 1100 is the chip used in the user equipment and/or the network device, the processing unit 1102 may be, for example, a processor, and the transceiver unit 1103 may be, for example, an input/output interface, a pin, or a circuit. The processing unit 1102 may execute computer-executable instructions stored in the storage unit. Optionally, the storage unit is a storage unit in the chip, such as a register or a cache. Alternatively, the storage unit may be a storage unit, such as a ROM, another type of static storage device that can store static information and instructions, or a RAM, that is outside the chip and that is in the user equipment and/or the network device.

In a first embodiment, the communication apparatus 1100 is applied to a first network device.

Specifically, the transceiver unit 1103 is configured to receive a first message sent by first user equipment, where the first message is used to request to perform identity verification on second user equipment.

The processing unit 1102 is configured to verify whether an identity of the second user equipment is valid.

The transceiver unit 1103 is further configured to send a verification result to the first user equipment, where the verification result indicates whether the identity of the second user equipment is valid.

In an implementation, the first message includes a first credential used to verify the first user equipment.

The processing unit 1102 is further configured to: before verifying whether the identity of the second user equipment is valid, verify validity of the first user equipment based on the first credential.

When verifying whether the identity of the second user equipment is valid, the processing unit 1102 is specifically configured to: if verifying that the first user equipment is valid, verify, based on the first message, whether the identity of the second user equipment is valid.

In an implementation, the processing unit 1102 is further configured to: after successfully performing authentication with the first user equipment, generate, by the first network device, a second credential for the first user equipment.

When verifying validity of the first user equipment based on the first credential, the processing unit 1102 is specifically configured to determine validity of the first user equipment based on the first credential and the second credential.

In an implementation, the first message includes identification information of the second user equipment, and the identification information of the second user equipment is a temporary identifier.

When verifying whether the identity of the second user equipment is valid, the processing unit 1102 is specifically configured to: determine a permanent identifier of the second user equipment based on the temporary identifier of the second user equipment; and verify, based on the permanent identifier of the second user equipment, whether the second user equipment is authenticated or authorized.

In an implementation, the first message includes information used for remote identification on the second user equipment.

The transceiver unit 1103 is further configured to receive information that is from the second user equipment and that is used for remote identification on the second user equipment.

When verifying whether the identity of the second user equipment is valid, the processing unit 1102 is specifically configured to determine whether the information that is from the second user equipment and that is used for remote identification on the second user equipment is consistent with the information that is included in the first message and that is used for remote identification on the second user equipment.

The communication apparatus 1100 is applied to first user equipment.

Specifically, the transceiver unit 1103 is configured to: receive a second message broadcast by second user equipment; send a first message to a first network device in response to the second message, where the first message is used to request to perform identity verification on the second user equipment; and receive a verification result sent by the first network device.

The processing unit 1102 is configured to: if the verification result indicates that an identity of the second user equipment is valid, process the second message.

In an implementation, the second message includes identification information of the second user equipment and/or information used for remote identification on the second user equipment.

The first message includes one or more of the following: the identification information of the second user equipment, a first credential used to verify the first user equipment, the second message, or the information used for remote identification on the second user equipment.

In an implementation, the processing unit 1102 is further configured to: after authentication between the first network device and the first user equipment succeeds, generate a second credential; and/or the transceiver unit 1103 is further configured to: after authentication between the first network device and the first user equipment succeeds, receive a second credential generated by the first network device.

The second credential generated by the first network device is the same as a second credential generated by the first user equipment.

In an implementation, when sending the first message to the first network device, the transceiver unit 1103 is specifically configured to send the first message to the first network device for one or more received second messages broadcast by one or more second user equipment, where the first message is specifically used to request to perform identity verification on the one or more second user equipment.

In an implementation, the processing unit 1102 is further configured to: before sending the first message to the first network device, determine, based on the second message, whether a distance between the first user equipment and the second user equipment is within a preset distance range.

When sending the first message to the first network device, the transceiver unit 1103 is specifically configured to: if the distance between the first user equipment and the second user equipment is within the preset distance range, send the first message to the first network device.

In an implementation, the processing unit 1102 is further configured to: before sending the first message to the first network device, determine, based on the second message, whether time at which the second user equipment broadcasts the second message is within a preset time range.

When sending the first message to the first network device, the transceiver unit 1103 is specifically configured to: if the time at which the second user equipment broadcasts the second message is within the preset time range, send the first message to the first network device.

In a second embodiment, the communication apparatus 1100 is applied to second user equipment.

Specifically, the processing unit 1102 is configured to encrypt a to-be-sent second message based on a symmetric key generated for a second network device when the second user equipment accesses a network.

The transceiver unit 1103 is configured to broadcast an encrypted second message.

In an implementation, the processing unit 1102 is specifically configured to: encrypt the to-be-sent second message by using the symmetric key generated for the second network device when the second user equipment accesses the network; or perform derivation based on the symmetric key generated for the second network device when the second user equipment accesses the network, to generate a subkey of the symmetric key, and encrypt a to-be-sent second message by using the subkey.

In an implementation, the transceiver unit 1103 is further configured to send, to the second network device, a derivation parameter and/or derivation algorithm used to generate the subkey.

In an implementation, the second message includes identification information of the second user equipment and/or information used for remote identification on the second user equipment.

The identification information of the second user equipment includes a temporary identifier of the second user equipment and/or a permanent identifier of the second user equipment. The information used for remote identification on the second user equipment includes position information of the second user equipment and/or time at which the second user equipment broadcasts the second message.

The communication apparatus 1100 is applied to a second network device.

The transceiver unit 1103 is configured to receive a first message sent by first user equipment, where the first message is used to request to perform identity verification on second user equipment.

The processing unit 1102 is configured to verify whether an identity of the second user equipment is valid.

The transceiver unit 1103 is further configured to send a verification result to the first user equipment, where the verification result indicates whether the identity of the second user equipment is valid.

In an implementation, the transceiver unit 1103 is further configured to receive an encrypted second message from the second user equipment.

In an implementation, the first message includes one or more of the following: identification information of the second user equipment, a first credential used to verify the first user equipment, the second message, or information used for remote identification on the second user equipment.

The second message includes the identification information of the second user equipment and/or the information used for remote identification on the second user equipment.

In an implementation, the first message is further used to request a key used by the second user equipment to encrypt the second message; the first message is further used to request a derivation parameter and/or derivation algorithm for generating a subkey used by the second user equipment to encrypt the second message; and/or the first message is further used to request the second network device to decipher the second message.

The verification result further includes the key used by the second user equipment to encrypt the second message, the derivation parameter and/or derivation algorithm for generating the subkey used by the second user equipment to encrypt the second message, and/or a deciphered second message.

In an implementation, the transceiver unit 1103 is further configured to receive, from the second user equipment, the derivation parameter and/or derivation algorithm used to generate the subkey.

The processing unit is further configured to generate the subkey of the symmetric key based on the symmetric key generated for the second network device when the second user equipment accesses the network and the derivation parameter and/or derivation algorithm used to generate the subkey.

In an implementation, the first message includes a first credential used to verify the first user equipment. The processing unit 1102 is further configured to: before verifying whether the identity of the second user equipment is valid, verify validity of the first user equipment based on the first credential.

When verifying whether the identity of the second user equipment is valid, the processing unit 1102 is configured to: if verifying that the first user equipment is valid, verify, based on the first message, whether the identity of the second user equipment is valid.

In an implementation, the processing unit 1102 is further configured to: after authentication between the second network device and the first user equipment succeeds, generate a second credential for the first user equipment.

The transceiver unit 1103 is further configured to: after authentication between the second network device and the first user equipment succeeds, receive a second credential generated by the first user equipment.

In an implementation, when verifying validity of the first user equipment based on the second credential, the processing unit 1102 is specifically configured to determine validity of the first user equipment based on the first credential and the second credential.

In an implementation, the first message includes identification information of the second user equipment, and the identification information of the second user equipment is a temporary identifier.

When verifying whether the identity of the second user equipment is valid, the processing unit 1102 is specifically configured to: determine a permanent identifier of the second user equipment based on the temporary identifier of the second user equipment; and verify, based on the permanent identifier of the second user equipment, whether the second user equipment is authenticated or authorized.

In an implementation, the first message includes information used for remote identification on the second user equipment.

The transceiver unit 1103 is further configured to receive information that is from the second user equipment and that is used for remote identification on the second user equipment.

When verifying whether the identity of the second user equipment is valid, the processing unit 1102 is specifically configured to determine whether the information that is from the second user equipment and that is used for remote identification on the second user equipment is consistent with the information that is included in the first message and that is used for remote identification on the second user equipment.

The communication apparatus 1100 is applied to first user equipment.

Specifically, the transceiver unit 1103 is configured to: receive a second message broadcast by second user equipment, where the second message is encrypted based on a symmetric key generated for a second network device when the second user equipment accesses a network; send a first message to the second network device in response to the second message, where the first message is used to request to perform identity verification on the second user equipment; and receive a verification result sent by a second network device.

The processing unit 1102 is configured to: if the verification result indicates that an identity of the second user equipment is valid, process the second message.

In an implementation, the second message includes identification information of the second user equipment and/or information used for remote identification on the second user equipment.

The first message includes one or more of the following: the identification information of the second user equipment, a first credential used to verify the first user equipment, the second message, or the information used for remote identification on the second user equipment.

In an implementation, the first message is further used to request a key used by the second user equipment to encrypt the second message; the first message is further used to request a derivation parameter and/or derivation algorithm for generating a subkey used by the second user equipment to encrypt the second message; and/or the first message is further used to request the second network device to decipher the second message.

The verification result further includes the key used by the second user equipment to encrypt the second message, the derivation parameter and/or derivation algorithm for generating the subkey used by the second user equipment to encrypt the second message, and/or a deciphered second message.

In an implementation, the processing unit 1102 is further configured to: after authentication between the second network device and the first user equipment succeeds, generate a second credential; and/or
   the transceiver unit 1103 is further configured to: after authentication between the second network device and the first user equipment succeeds, receive a second credential generated by the second network device.

A second credential generated by the second network device is the same as a second credential generated by the first user equipment.

In an implementation, when sending the first message to the second network device, the transceiver unit 1103 is specifically configured to send the first message to the first network device for one or more received second messages broadcast by one or more second user equipment, where the first message is specifically used to request to perform identity verification on the one or more second user equipment.

In an implementation, the processing unit 1102 is further configured to: before sending the first message to the second network device, determine, based on the second message, whether a distance between the first user equipment and the second user equipment is within a preset distance range.

When sending the first message to the second network device, the transceiver unit 1103 is specifically configured to: if the distance between the first user equipment and the second user equipment is within the preset distance range, send the second message to the second network device.

In an implementation, the processing unit 1102 is further configured to: before sending the first message to the second network device, determine, based on the second message, whether time at which the second user equipment broadcasts the second message is within a preset time range.

When sending the first message to the second network device, the transceiver unit 1103 is specifically configured to: if the time at which the second user equipment broadcasts the second message is within the preset time range, send the first message to the second network device.

In a third embodiment, the communication apparatus 1100 is applied to second user equipment.

Specifically, the processing unit 1102 is configured to: receive, by using the transceiver unit 1103, a third message sent by first user equipment, where the third message is used to request the second user equipment to reply with information used for remote identification; and send a fourth message to the first user equipment by using the transceiver unit 1103, where the fourth message includes information used for remote identification on the second user equipment.

The third message further includes one or more of the following: a security token token used to verify the first user equipment, identification information of the first user equipment, time at which the first user equipment sends the third message, position information of the first user equipment, cell information of the first user equipment, or signal strength of a message received by the first user equipment from a network device.

In an implementation, the processing unit 1102 is further configured to: before sending the fourth message to the first user equipment, determine, based on the third message, whether a distance between the first user equipment and the second user equipment is within a preset distance range.

When sending the fourth message to the first user equipment, the transceiver unit 1103 is specifically configured to: if the distance between the first user equipment and the second user equipment is within the preset distance range, send the fourth message to the first user equipment.

In an implementation, the processing unit 1102 is further configured to: before sending the fourth message to the first user equipment, determine, based on the third message, whether the first user equipment is in a cell in which the second user equipment is located or is in a neighboring cell of the cell in which the second user equipment is located.

When sending the fourth message to the first user equipment, the transceiver unit 1103 is specifically configured to: if the first user equipment is in the cell in which the second user equipment is located or is in the neighboring cell of the cell in which the second user equipment is located, send the fourth message to the first user equipment.

In an implementation, the transceiver unit 1103 is further configured to: before sending the fourth message to the first user equipment, send a fifth message to the network device, where the fifth message indicates the network device to verify validity of the first user equipment; and receive a sixth message sent by the network device, where the sixth message indicates whether an identity of the first user equipment is valid.

In an implementation, the sixth message further includes a public key of the first user equipment, a first symmetric key generated by the second network device when the first user equipment accesses a network, or a derivation parameter and/or derivation algorithm used to generate a first subkey of the first symmetric key.

In an implementation, the third message further includes a first credential used to verify an identity of the first user equipment, and the first credential includes a token generated for the first user equipment after authentication between the first user equipment and the first network device is performed or a digital certificate that is of the first user equipment that is signed by the first network device, where the digital certificate includes the public key of the first user equipment.

The processing unit 1102 is further configured to: before sending the fourth message to the first user equipment, perform identity verification on the first user equipment based on the first credential, and the second user equipment determines validity of an identity of the first user equipment.

In an implementation, the processing unit 1102 is further configured to: before sending the fourth message to the first user equipment, encrypt a to-be-sent fourth message by using the public key of the first user equipment; encrypt a to-be-sent fourth message by using the first symmetric key generated by the network device when the first user equipment accesses the network; or perform derivation based on the first symmetric key to obtain a first subkey, and encrypt a to-be-sent fourth message by using the first subkey.

The communication apparatus 1100 is applied to first user equipment.

Specifically, the processing unit 1102 is configured to: send, by using the transceiver unit 1103, a third message to second user equipment, where the third message is used to request the second user equipment to reply with information used for remote identification; and receive a fourth message from the second user equipment by using the transceiver unit 1103, where the fourth message includes information used for remote identification on the second user equipment.

The third message further includes one or more of the following: a first credential used to verify an identity of the first user equipment, identification information of the first user equipment, time at which the first user equipment sends the third message, a count of messages that have been sent by the first user equipment, position information of the first user equipment, cell information of the first user equipment, or signal strength of a message received by the first user equipment from the network device.

In an implementation, the first credential used to verify the identity of the first user equipment includes a token generated for the first user equipment after authentication between the first user equipment and the first network device is performed or a digital certificate that is of the first user equipment that is signed by the first network device, where the digital certificate includes a public key of the first user equipment.

In an implementation, the fourth message is encrypted by using the public key of the first user equipment; the fourth message is encrypted by using a second symmetric key generated for a second network device when the second user equipment accesses a network; or the fourth message is encrypted by using a second subkey that is generated through derivation based on a second symmetric key.

It may be understood that, for a specific implementation process and a corresponding beneficial effect when the communication apparatus is used for the communication method, refer to related descriptions in the foregoing method embodiments, and details are not described herein again.

Figure 12:
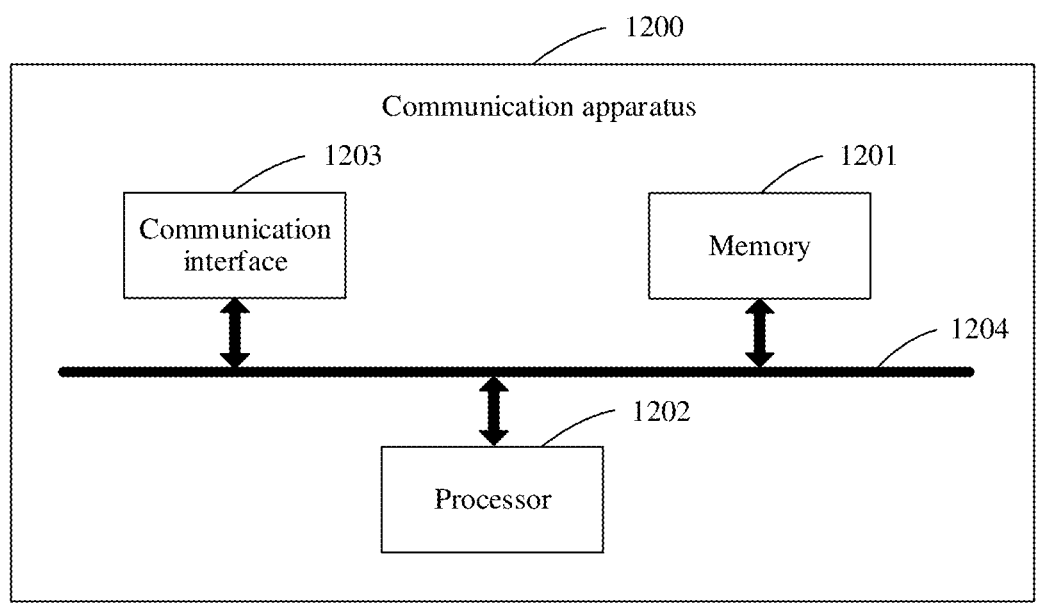
FIG. 12 is a schematic diagram of a communication apparatus according to an embodiment of this application.

FIG. 12 is a schematic diagram of a communication apparatus according to this application. The communication apparatus may be the foregoing mobility management network element or terminal device. The communication apparatus 1200 includes a processor 1202, a communication interface 1203, and a memory 1201. Optionally, the communication apparatus 1200 may further include a communication line 1204. The communication interface 1203, the processor 1202, and the memory 1201 may be connected to each other through the communication line 1204. The communication line 1204 may be a peripheral component interconnect (peripheral component interconnect, PCI for short) bus, an extended industry standard architecture (extended industry standard architecture, EISA for short) bus, or the like. The communication line 1204 may be classified into an address bus, a data bus, a control bus, and the like. For ease of representation, only one bold line is used to represent the bus in FIG. 12, but this does not mean that there is only one bus or only one type of bus.

The processor 1202 may be a CPU, a microprocessor, an ASIC, or one or more integrated circuits configured to control program execution in the solutions of this application.

The communication interface 1203 is configured to communicate with another device or a communication network, such as an Ethernet, a RAN, a wireless local area network (wireless local area network, WLAN), or a wired access network by using any apparatus such as a transceiver.

The memory 1201 may be a ROM or another type of static storage device that can store static information and instructions, or a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile optical disc, a blue optical disc, and the like), a magnetic disk storage medium or another magnetic storage device, or any other medium that can carry or store expected program code in a form of an instruction structure or a data structure and can be accessed by a computer. However, this is not limited herein. The memory may exist independently and is connected to the processor through the communication line 1204. The memory may alternatively be integrated with the processor.

The memory 1201 is configured to store computer-executable instructions for executing the solutions of this application, and the processor 1202 controls execution of the computer-executable instructions. The processor 1202 is configured to execute the computer-executable instructions stored in the memory 1201, to implement the communication method of the terminal device according to the foregoing embodiments of this application.

Optionally, the computer-executable instructions in embodiments of this application may also be referred to as application program code. This is not specifically limited in embodiments of this application.

A person of ordinary skill in the art may understand that first, second, and various reference numerals in this application are merely distinguished for convenient description, and are not used to limit a scope of embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. At least two means two or more. "At least one", "any one", or a similar expression thereof means any combination of the items, including a singular item (piece) or any combination of plural items (pieces). For example, at least one (piece, or type) of a, b, or c may indicate: a, b, c, a and b, a and c, b and c, or a, b, and c, where a, b, and c may be singular or plural. The term "a plurality of" indicates two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented through software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The various illustrative logical units and circuits described in embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may further be integrated into the processor. The processor and the storage medium may be disposed in the ASIC.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and embodiments thereof, it is clear that various modifications and combinations may be made to them without departing from the scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
receiving, by a network device, a first message from first user equipment, wherein the first message requests to perform identity verification on second user equipment;

verifying, by the network device, whether an identity of the second user equipment is valid; and sending, by the network device, a verification result to the first user equipment, wherein the verification result indicates whether the identity of the second user equipment is valid, wherein the second user equipment comprises at least one of:
an unmanned aerial vehicle (UAV), or
a controller configured to wirelessly control the UAV.

2. The method according to claim 1, wherein
the first message comprises a first credential for verifying the first user equipment;
before the verifying, by the network device, whether the identity of the second user equipment is valid, the method further comprises:
verifying, by the network device, validity of the first user equipment based on the first credential; and
the verifying, by the network device, whether the identity of the second user equipment is valid comprises:
in response to verifying that the first user equipment is valid, verifying, by the network device based on the first message, whether the identity of the second user equipment is valid.

3. The method according to claim 2, wherein
the method further comprises:
in response to authentication between the network device and the first user equipment being successful, generating, by the network device, a second credential for the first user equipment; and
the verifying, by the network device, validity of the first user equipment comprises:
determining, by the network device, validity of the first user equipment based on the first credential and the second credential.

4. The method according to claim 1, wherein
the first message comprises identification information of the second user equipment, and the identification information of the second user equipment is a temporary identifier; and
the verifying, by the network device, whether the identity of the second user equipment is valid comprises:
determining, by the network device, a permanent identifier of the second user equipment based on the temporary identifier of the second user equipment; and
verifying, by the network device based on the permanent identifier of the second user equipment, whether the second user equipment is authenticated or authorized.

5. The method according to claim 1, wherein
the first message comprises first information for remote identification of the second user equipment;
the method further comprises:
receiving, by the network device from the second user equipment, second information for remote identification on the second user equipment; and
the verifying, by the network device, whether the identity of the second user equipment is valid comprises:
determining, by the network device, whether the second information is consistent with the first information.

6. The method according to claim 1, wherein
the network device is an unmanned aerial system traffic management (UTM) or unmanned aerial system service supplier (USS) function.

7. A communication method, comprising:
receiving, by an apparatus, a second message from second user equipment;
sending, by the apparatus, a first message to a network device in response to the second message, wherein the first message requests to perform identity verification on the second user equipment;
receiving, by the apparatus, a verification result from the network device; and
in response to the verification result indicates that an identity of the second user equipment is valid, processing, by the apparatus, the second message,
wherein
before the sending the first message to the network device, the method further comprises:
determining, by the apparatus based on the second message, whether a distance between the apparatus and the second user equipment is within a preset distance range; and
the sending, by the apparatus, the first message to the network device comprises:
in response to the distance between the apparatus and the second user equipment being within the preset distance range, sending, by the apparatus, the first message to the network device.

8. The method according to claim 7, wherein
the second user equipment comprises at least one of:
an unmanned aerial vehicle (UAV), or
a controller configured to wirelessly control the UAV, and
the network device is an unmanned aerial system traffic management (UTM) or unmanned aerial system service supplier (USS) function.

9. The method according to claim 7, wherein
the second message comprises at least one of:
identification information of the second user equipment, or
information for remote identification on the second user equipment; and
the first message comprises at least one of:
the identification information of the second user equipment,
a first credential for verifying the first user equipment, or
the information for remote identification on the second user equipment.

10. The method according to claim 7, wherein the apparatus is first user equipment or a chip in the first user equipment.

11. A network device, comprising:
at least one processor; and
at least one memory storing instructions, wherein the instructions, when executed by the at least one processor, cause the network device to perform operations comprising:
receiving a first message from first user equipment, wherein the first message requests to perform identity verification on second user equipment;
verifying whether an identity of the second user equipment is valid; and
sending a verification result to the first user equipment, wherein the verification result indicates whether the identity of the second user equipment is valid,
wherein the second user equipment comprises at least one of:
an unmanned aerial vehicle (UAV), or
a controller configured to wirelessly control the UAV.

12. The network device according to claim 11, wherein
the first message comprises a first credential for verifying the first user equipment;
before the verifying whether the identity of the second user equipment is valid, the operations further comprise:
verifying validity of the first user equipment based on the first credential; and
the verifying whether the identity of the second user equipment is valid comprises:
in response to verifying that the first user equipment is valid, verifying, based on the first message, whether the identity of the second user equipment is valid.

13. The network device according to claim 12, wherein the operations further comprise:
in response to authentication between the network device and the first user equipment being successful, generating a second credential for the first user equipment; and
the verifying validity of the first user equipment comprises:
determining validity of the first user equipment based on the first credential and the second credential.

14. The network device according to claim 11, wherein
the first message comprises identification information of the second user equipment, and the identification information of the second user equipment is a temporary identifier; and
the verifying whether the identity of the second user equipment is valid comprises:
determining a permanent identifier of the second user equipment based on the temporary identifier of the second user equipment; and
verifying, based on the permanent identifier of the second user equipment, whether the second user equipment is authenticated or authorized.

15. The network device according to claim 11, wherein
the first message comprises first information for remote identification of the second user equipment;
the operations further comprise:
receiving, from the second user equipment, second information for remote identification on the second user equipment; and
the verifying whether the identity of the second user equipment is valid comprises:
determining whether the second information is consistent with the first information.

16. An apparatus, comprising:
at least one processor; and
at least one memory storing instructions, wherein the instructions, when executed by the at least one processor, cause the apparatus to:
receive a second message from second user equipment;
determine, based on the second message, whether a distance between the apparatus and the second user equipment is within a preset distance range;
in response to the distance between the apparatus and the second user equipment being within the preset distance range, send a first message to a network device in response to the second message, wherein the first message requests to perform identity verification on the second user equipment;
receive a verification result from the network device; and
process the second message in response to the verification result indicates that an identity of the second user equipment is valid.

17. The network device according to claim 16, wherein
the second message comprises at least one of:
identification information of the second user equipment, or
information for remote identification on the second user equipment; and
the first message comprises at least one of:
the identification information of the second user equipment,
a first credential for verifying the first user equipment, or
the information for remote identification on the second user equipment.

* * * * *